(12) United States Patent
Kamada et al.

(10) Patent No.: US 7,753,818 B2
(45) Date of Patent: Jul. 13, 2010

(54) CONTROLLER OF DRIVE DEVICE FOR VEHICLE

(75) Inventors: Atsushi Kamada, Toyota (JP); Atsushi Tabata, Okazaki (JP); Yuji Inoue, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 11/908,337

(22) PCT Filed: Mar. 15, 2006

(86) PCT No.: PCT/JP2006/305624

§ 371 (c)(1),
(2), (4) Date: Sep. 11, 2007

(87) PCT Pub. No.: WO2006/098483

PCT Pub. Date: Sep. 21, 2006

(65) Prior Publication Data

US 2009/0227407 A1  Sep. 10, 2009

(30) Foreign Application Priority Data

Mar. 16, 2005  (JP) ............................. 2005-075856

(51) Int. Cl.
*F16H 3/72* (2006.01)

(52) U.S. Cl. ...................................................... 475/153

(58) Field of Classification Search ............... 477/8, 477/108

See application file for complete search history.

(56) References Cited

U.S. PATENT DOCUMENTS 6,991,054 B2 * 1/2006 Takaoka et al. ......... 180/65.235

| 2005/0137042 A1 | 6/2005 | Schmidt et al. |
| 2005/0204537 A1 | 9/2005 | Reed et al. |
| 2005/0204861 A1 | 9/2005 | Reed et al. |

(Continued)

FOREIGN PATENT DOCUMENTS

JP  11 198668  7/1999

(Continued)

*Primary Examiner*—Sherry L Estremsky
*Assistant Examiner*—Edwin A. Young
(74) *Attorney, Agent, or Firm*—Oblon, Spivak, McClelland, Maier & Neustadt, L.L.P.

(57) ABSTRACT

A control apparatus for a vehicular drive system including a differential mechanism operable to distribute an output of an engine to a first electric motor and a power transmitting member, and a second electric motor connected to the power transmitting member. The control apparatus, which permits size reduction of the vehicular drive system, or improvements of fuel economy and vehicle drivability, includes a switching clutch or switching brake for switching a the differential mechanism between a continuously-variable shifting state and a step-variable shifting state, to enable the drive system to have both of an advantage of a fuel economy improvement of a transmission the speed ratio of which is electrically variable, and an advantage of high power transmitting efficiency of a gear type power transmitting device. The control apparatus includes an engine-torque-variation restriction control operable in the continuously-variable shifting state of the differential mechanism, to control an electric path torque, for restricting a variation of the torque to be transmitted to the power transmitting member, irrespective of a variation of the engine torque, so that the engine torque variation to be transmitted to drive wheels is restricted to improve the vehicle drivability.

15 Claims, 14 Drawing Sheets

U.S. PATENT DOCUMENTS

| | | |
|---|---|---|
| 2005/0204862 A1 | 9/2005 | Reed et al. |
| 2005/0205335 A1 | 9/2005 | Reed et al. |
| 2005/0205373 A1 | 9/2005 | Foster et al. |
| 2006/0063628 A1* | 3/2006 | Sowul et al. .................. 475/5 |
| 2006/0111212 A9* | 5/2006 | Ai et al. ........................ 475/5 |

FOREIGN PATENT DOCUMENTS

| | | |
|---|---|---|
| JP | 2000 2327 | 1/2000 |
| JP | 2000 6676 | 1/2000 |
| JP | 2000 156913 | 6/2000 |
| JP | 2000 209706 | 7/2000 |
| JP | 2001 234775 | 8/2001 |
| JP | 2004 42834 | 2/2004 |
| JP | 2004 345527 | 12/2004 |
| JP | 2006 132453 | 5/2006 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD |
| R |  |  | ○ |  |  |  | ○ | 3.209 | 4.76 |
| N |  | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N | ○ |  |  |  |  |  |  |  |

○ ENGAGED
◎ ENGAGED FOR STEP-VARIABLE SHIFTING, AND RELEASED FOR CONTINUOUSLY-VARIABLE SHIFTING

CONTROLLER OF DRIVE DEVICE FOR VEHICLE

TECHNICAL FIELD

The present invention relates in general to a control apparatus for a vehicular drive system, and more particularly to a technique for reducing the size of an electric motor of a vehicular drive system which includes the electric motor and a differential mechanism capable of performing a differential function.

BACKGROUND ART

There is known a vehicular drive system including a differential mechanism operable to distribute an output of an engine to a first electric motor and an output shaft, and a second electric motor disposed between the output shaft of the differential mechanism and drive wheels. Patent Document 1 discloses an example of such a vehicular drive system in the form of a hybrid vehicle drive system. In this hybrid vehicle drive system, the differential mechanism is constituted by a planetary gear set, for example, and a major portion of an output of the engine is mechanically transmitted to the drive wheels through the differential function of the differential mechanism, while the other portion of the output of the engine is electrically transmitted from the first electric motor to the second electric motor through an electric path, so that the differential mechanism functions as a transmission the seed ratio of which is electrically variable, for instance, as an electrically controlled continuously variable transmission. The hybrid vehicle drive system is controlled by a control device such that the vehicle is driven with the engine kept in an optimum operating state for improving the fuel economy.
Patent Document 1: JP-2000-2327 A
Patent Document 2: JP-2001-234775 A Generally, a continuously variable transmission is known as a device for improving the fuel economy of the vehicle, while a gear type power transmitting device such as a step-variable automatic transmission is known as a device having a high degree of power transmitting efficiency. However, there has not been available a power transmitting mechanism which has advantages of those two devices. For instance, the hybrid vehicular drive system disclosed in the above-identified Patent Document 1 has an electric path for transmitting an electric energy from the first electric motor to the second electric motor, namely, a power transmitting path through which a portion of the vehicle drive force is transmitted as the electric energy, so that the first electric motor must be large-sized with an increase of the nominal engine output, and the second electric motor which is operated by the electric energy generated by the first electric motor must also be large-sized. Accordingly, the drive system tends to be unfavorably large-sized. Alternatively, a portion of the engine output is once converted into an electric energy, which is subsequently used to drive the drive wheels, so that there is a risk of deterioration of the fuel economy in some running condition of the vehicle, for example, during a high-speed running of the vehicle. There is a similar problem where the power transmitting mechanism as described above is used as a transmission the speed ratio of which is electrically controlled, for example, as a continuously variable transmission called "an electric CVT".

It is known that the output torque of the engine (hereinafter referred to simply as "engine torque") varies or fluctuates due to periodic ignition (explosion) of its cylinders, or switching between a lean-burn state in which the air-fuel ratio of the engine is higher than the stoichiometric value, and a rich-burn state in which the air-fuel ratio is lower than the stoichiometric value.

As described in Patent Document 2, for example, an operation of the engine in the lean-burn state for improving the fuel economy of the engine causes an increase of concentration of oxygen contained in the exhaust gas, resulting in promotion of absorption of NOx by an NOx absorbent provided in the exhaust passage. Since the NOx absorbent is limited in its capacity to absorb NOx, a so-called "rich spike" is implemented to temporarily switch the engine from the lean-burn state to the rich-burn state, that is, to the fuel-rich state, for discharging the absorbed NOx from the NOx absorbent so that the NOx absorbent is restored to its state for effective absorption of NOx. The rich spike results in an increase of the fuel supply to the engine, and a consequent temporary increase (variation) of the engine torque.

If the engine torque variation is transmitted to the drive wheels, there arises a variation of the vehicle drive torque, giving rise to a risk of deterioration of the drivability of the vehicle. It is desired to reduce the amount of the engine torque variation to be transmitted to the drive wheels. For instance, a vehicular drive system including a torque converter with a lock-up clutch disposed between an engine and an automatic transmission is arranged to place the lockup clutch in a slipping or released state, for thereby causing the torque converter to absorb the engine torque variation, to reduce the amount of the engine torque variation to be transmitted to the drive wheels.

In the drive system as disclosed in Patent Document 1 which is not provided with a fluid-operated power transmitting device such as the torque converter, however, the engine torque variation may be transmitted to the drive wheels through a power transmitting path connecting the engine and the drive wheels, leading to a risk of deterioration of the drivability of the vehicle due to the engine torque variation. The vehicular drive system which solves the problem of the hybrid vehicle drive system also suffers from a risk of deterioration of the engine torque variation.

The present invention was made in view of the background art described above. It is an object of this invention to provide a control apparatus for a vehicular drive system including a differential mechanism capable of performing a differential function to distribute an output of an engine to a first electric motor and an output shaft, and an electric motor disposed in a power transmitting path between the differential mechanism and a drive wheel, which control apparatus permits size reduction of the drive system or improvements of fuel economy and drivability of a vehicle.

DISCLOSURE OF THE INVENTION

According to the present invention as defined in claim 1, there is provided a control apparatus for (a) a vehicular drive system including an engine, and a continuously-variable transmission portion operable as an electrically controlled continuously variable transmission and having a differential mechanism operable to distribute an output of the engine to a first electric motor and a power transmitting member, and a second electric motor disposed in a power transmitting path between the power transmitting member and a drive wheel of a vehicle, the control apparatus being characterized by comprising (b) a differential-state switching device disposed in the differential mechanism and configured to place the continuously-variable transmission portion selectively in one of a continuously-variable shifting state in which the continuously-variable transmission portion is operable as the electrically controlled continuously variable transmission, and a non-continuously-variable shifting state in which the continuously-variable transmission portion is not operable as the electrically controlled continuously variable transmission, (c) engine-torque-variation restriction control means configured to control an electric energy to be supplied to the second electric motor in the continuously-variable shifting state of the continuously-variable transmission portion, for restricting a variation of a transmission torque to be transmitted to the power transmitting member, irrespective of a variation of an output torque of the engine, and (d) switching control means operable when the continuously-variable transmission portion is placed in the non-continuously-variable shifting state, and configured to switch the continuously-variable transmission portion to the continuously-variable shifting state, for enabling the engine-torque-variation restriction control means to control the electric energy to be supplied to the second electric motor.

In the control apparatus constructed as described above, the continuously-variable transmission portion of the vehicular drive system is selectively switched by the differential-state switching device, between the continuously-variable shifting state in which the continuously-variable transmission portion is operable as the electrically controlled continuously variable transmission, and the non-continuously-variable shifting state, for example, a step-variable shifting state in which the continuously-variable transmission portion is not operable as the electrically controlled continuously variable transmission, so that the vehicular drive system has both an advantage of fuel economy improvement of a transmission the speed ratio of which is electrically variable, and an advantage of high power transmitting efficiency of a gear type power transmitting device for mechanical power transmission. For example, the continuously-variable transmission portion is placed in the continuously-variable shifting state, in a low- or medium-speed running state or a low- or medium-output running state of the vehicle, with the engine operating in a normal output region, so that the fuel economy of the vehicle is improved. In a high-speed running state of the vehicle, however, the continuously-variable transmission portion is placed in the non-continuously-variable shifting state in which the output of the engine is transmitted to the drive wheel, primarily through a mechanical power transmitting path, making it possible to reduce a loss of conversion between a mechanical energy and an electric energy, which would take place when the continuously-variable transmission portion is operated as the transmission the speed ratio of which is electrically controlled. Where the differential-state switching device is arranged to place the continuously-variable transmission portion in the non-continuously-variable shifting state during the high-speed running of the vehicle, the continuously-variable transmission portion is operated as the transmission the speed ratio of which is electrically variable, only in the low- or medium-speed or low- or medium-output running state, so that the maximum amount of the electric energy that should be generated by the electric motor can be reduced, whereby the required size of the electric motor, and the required size of the vehicular drive system including the electric motor can be further reduced.

In the vehicular drive system including the continuously-variable transmission portion switchable between the continuously-variable shifting state and the non-continuously-variable shifting state, the engine-torque-variation restriction control means is configured to control the electric energy to be supplied to the second electric motor in the continuously-variable shifting state of the differential portion, so that the variation of the transmission torque to be transmitted to the power transmitting member is restricted, irrespective of the variation of the output torque of the engine, whereby the engine torque variation to be transmitted to the drive wheel is restricted to improve the vehicle drivability.

The switching control means is operated in the non-continuously-variable state of the continuously-variable transmission portion, to switch the continuously-variable transmission portion to the continuously-variable shifting state, for enabling the engine-torque-variation restriction control means to control the electric energy to be supplied to the second electric motor, so that the vehicle drivability is improved.

According to the invention as defined in claim 2, there is provided a control apparatus for (a) a vehicular drive system including an engine, and a differential portion having a differential mechanism operable to distribute an output of the engine to a first electric motor and a power transmitting member, and a second electric motor disposed in a power transmitting path between the power transmitting member and a drive wheel of a vehicle, the control apparatus being characterized by comprising (b) a differential-state switching device disposed in the differential mechanism and configured to place the differential mechanism selectively in one of a differential state in which the differential mechanism is operable to perform a differential function, and a non-differential state in which the differential mechanism is not operable to perform the differential function, (c) engine-torque-variation restriction control means configured to control an electric energy to be supplied to the second electric motor in the differential state of the differential portion, for restricting a variation of a transmission torque to be transmitted to the power transmitting member, irrespective of a variation of an output torque of the engine, and (d) switching control means operable when the differential portion is placed in the non-differential state, and configured to switch the differential portion to the differential state, for enabling the engine-torque-variation restriction control means to control the electric energy to be supplied to the second electric motor.

In the control apparatus constructed as described above, the differential mechanism of the vehicular drive system is selectively switched by the differential-state switching device, between the differential state in which the differential portion is operable to perform the differential function, and the non-differential state, for example, a locked state in which the differential portion is not operable to perform the differential function, so that the vehicular drive system has both an advantage of fuel economy improvement of a transmission the speed ratio of which is electrically variable, and an advantage of high power transmitting efficiency of a gear type power transmitting device for mechanical power transmission. For example, the differential mechanism is placed in the differential state, in a low- or medium-speed running state or a low- or medium-output running state of the vehicle, with the engine operating in a normal output region, so that the fuel economy of the vehicle is improved. In a high-speed running state of the vehicle, however, the differential mechanism is placed in the non-differential state in which the output of the engine is transmitted to the drive wheel, primarily through a mechanical power transmitting path, making it possible to reduce a loss of conversion between a mechanical energy and an electric energy, which would take place when the differential mechanism is operated as the transmission the speed ratio of which is electrically controlled. Where the differential-state switching device is arranged to place the differential mechanism in the non-differential state during the high-speed running of the vehicle, the differential mechanism is operated as the transmission the speed ratio of which is electrically variable, only in the low- or medium-speed or low- or medium-output running state, so that the maximum amount of the electric energy that should be generated by the electric motor can be reduced, whereby the required size of the electric motor, and the required size of the vehicular drive system including the electric motor can be further reduced.

In the vehicular drive system including the differential mechanism switchable between the differential state and the non-differential state, the engine-torque-variation restriction control means is configured to control the electric energy to be supplied to the second electric motor in the differential of the differential portion, so that the variation of the transmission torque to be transmitted to the power transmitting member is restricted, irrespective of the variation of the output torque of the engine, whereby the engine torque variation to be transmitted to the drive wheel is restricted to improve the vehicle drivability.

The switching control means is operated in the non-differential state of the differential portion, to switch the differential portion to the differential state, for enabling the engine-torque-variation restriction control means to control the electric energy to be supplied to the second electric motor, so that the vehicle drivability is improved.

According to the invention as defined in claim 3, the engine has a variable air-fuel ratio, and the control apparatus further comprises air-fuel ratio control means configured to implement a rich spike for temporarily hold the air-fuel ratio in a rich-burn state. In this case, the engine-torque-variation restriction control means limits the electric energy to be supplied to the second electric motor, while an output torque of the engine is varying due to the rich spike implemented by the air-fuel ratio control means. Accordingly, even in the event of a variation of the engine torque due to the rich spike, the engine torque variation to be transmitted to the drive wheel is restricted, so that the vehicle drivability is improved.

According to the invention as defined in claim 4, the control apparatus further comprises an electric energy storage device for storing the electric energy, and the-torque-variation restriction control means limits the electric energy to be supplied to the second electric motor by storing the electric energy in the electric energy storage device. In this case, the electric energy to be otherwise supplied to the second electric motor is stored in the electric energy storage device, so that the fuel economy is further improved.

According to the invention as defined in claim 5, the engine-torque-variation restriction control means varies a rotating speed of the first electric motor in synchronization with oscillation of an output torque of the engine, to thereby restrict the oscillation of the output torque to be transmitted to the power transmitting member. In this case, the torque oscillation of the engine is less likely to be transmitted to the downstream portion of the power transmitting path, such as the power transmitting member and the vehicle drive wheel, so that the vehicle drivability is improved.

Preferably, the differential-state switching device places the differential mechanism in a differential state in which the differential mechanism is operable to perform a differential function, to thereby place the continuously-variable transmission portion in said continuously-variable shifting state, and places the differential mechanism in a non-differential state, for example, a locked-state in which the differential mechanism is not operable to perform the differential function, to thereby place the continuously-variable transmission portion in the non-continuously-variable shifting state. In this case, the continuously-variable transmission portion is switched between the continuously-variable shifting state and the non-continuously-variable shifting state.

Preferably, the differential mechanism has a first element connected to the engine, a second element connected to the first electric motor, and a third element connected to the power transmitting member, and the differential-state switching device permits the first through third elements to be rotated relative to each other, for thereby placing the differential portion in the differential state, and permits the first through third elements to be rotated as a unit or hold the second element stationary, for thereby placing the differential portion in the non-differential state. In this case, the differential mechanism is switchable between the differential state and the non-differential state.

Preferably, the differential-state switching device includes a clutch operable to connect any two elements of the first through third elements to each other for rotating the first through third elements as a unit, and/or a brake operable to fix the second element to a stationary member. In this case, the differential mechanism is simply switchable between the differential state and the non-differential state.

Preferably, the clutch and the brake are released to place the differential mechanism in the differential state in which the first through third elements are rotatable relative to each other, to enable the differential mechanism to operate as an electrically controlled differential device, and the clutch is engaged to enable the differential mechanism to operate as a transmission having a speed ratio of 1, or the brake is engaged to enable the differential mechanism to operate as a speed-increasing transmission having a speed ratio smaller than 1. In this case, the differential mechanism is switchable between the differential state and the non-differential state, and is operable as a transmission having a single fixed speed ratio or a plurality of fixed speed ratios.

Preferably, the differential mechanism is a planetary gear set having a carrier functioning as the first element, a sun gear functioning as the second element, and a ring gear functioning as the third element. In this case, the required axial dimension of the differential mechanism is reduced, and the differential mechanism constituted by the single planetary gear set is simple in construction.

Preferably, the planetary gear set is a single-pinion type planetary gear set. In this case, the required axial dimension of the differential mechanism is reduced, and the differential mechanism constituted by the single planetary gear set is simple in construction.

Preferably, the above-described power transmitting path includes a transmission portion, and the vehicular drive system has an overall speed ratio defined by a speed ratio of this transmission portion and a speed ratio of the above-described continuously-variable transmission portion. In this case, the vehicle drive force can be obtained over a wide range of speed ratio, owing to a change of the speed ratio of the transmission portion of the power transmitting path, so that the control efficiency of the continuously-variable transmission portion operating as an electrically controlled continuously variable transmission is further improved.

Preferably, the above-described power transmitting path includes a transmission portion, and the vehicular drive system has an overall speed ratio defined by a speed ratio of this transmission portion of the power transmitting path and a speed ratio of the differential portion. In this case, the vehicle drive force can be obtained over a wide range of speed ratio, owing to a change of the speed ratio of the transmission portion of the power transmitting path.

Preferably, the transmission portion of the power transmitting path is a step-variable automatic transmission. In this case, a continuously variable transmission is constituted by the continuously-variable transmission portion placed in the continuously-variable shifting state and the transmission portion of the power transmitting path, while a step-variable transmission is constituted by the continuously-variable transmission portion placed in the non-continuously-variable shifting state and the transmission portion of the power transmitting path.

Preferably, the transmission portion of the power transmitting path is a step-variable automatic transmission. In this case, a continuously variable transmission is constituted by the differential portion placed in the continuously-variable shifting state and the transmission portion of the power transmitting path, while a step-variable transmission is constituted by the differential portion placed in the non-continuously-variable shifting state and the transmission portion of the power transmitting path.

EXPLANATION OF REFERENCE SIGNS

8: Engine
10, 70: Transmission mechanism (Drive system)
11: Differential portion (Continuously-variable transmission portion)
16: Power distributing mechanism (Differential mechanism)
18: Power transmitting member
20, 72: Automatic transmission portion (Transmission portion)
38: Drive wheels
40: Electronic control device (Control device)
50: Switching control means
80: Engine-torque-variation restriction control means
90: Air-fuel-ratio control means
C0: Switching clutch (Differential-state switching device)
B0: Switching brake (Differential-state switching device)
M1: First electric motor
M2: Second electric motor

BEST MODE FOR CARRYING OUT THE INVENTION

The embodiments of this invention will be described in detail by reference to the drawings.

Embodiment 1

Figures 1, 2:
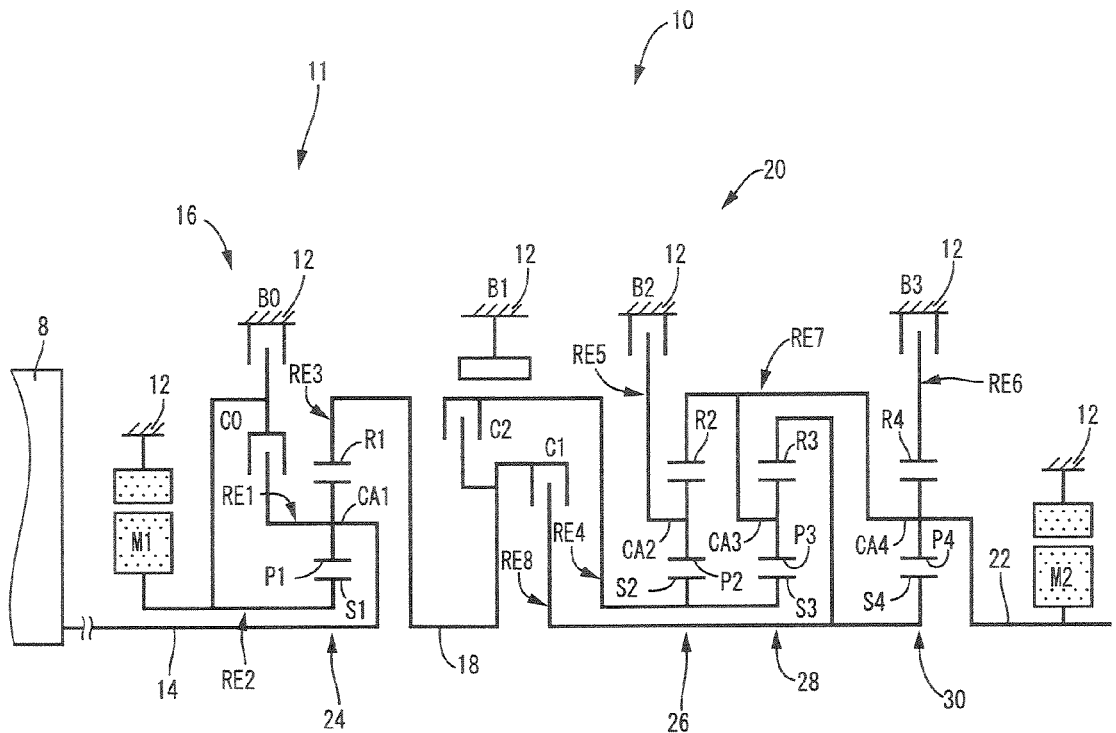
FIG. 1 is a schematic view for explaining an arrangement of a drive system of a hybrid vehicle according to one embodiment of the present invention.
FIG. 2 is a table indicating shifting actions of the hybrid vehicle drive system of FIG. 1 in a selected one of a continuously-variable shifting state and a step-variable shifting state, in relation to different combinations of operating states of hydraulically operated frictional coupling devices to effect the respective shifting actions.
Figure 5:
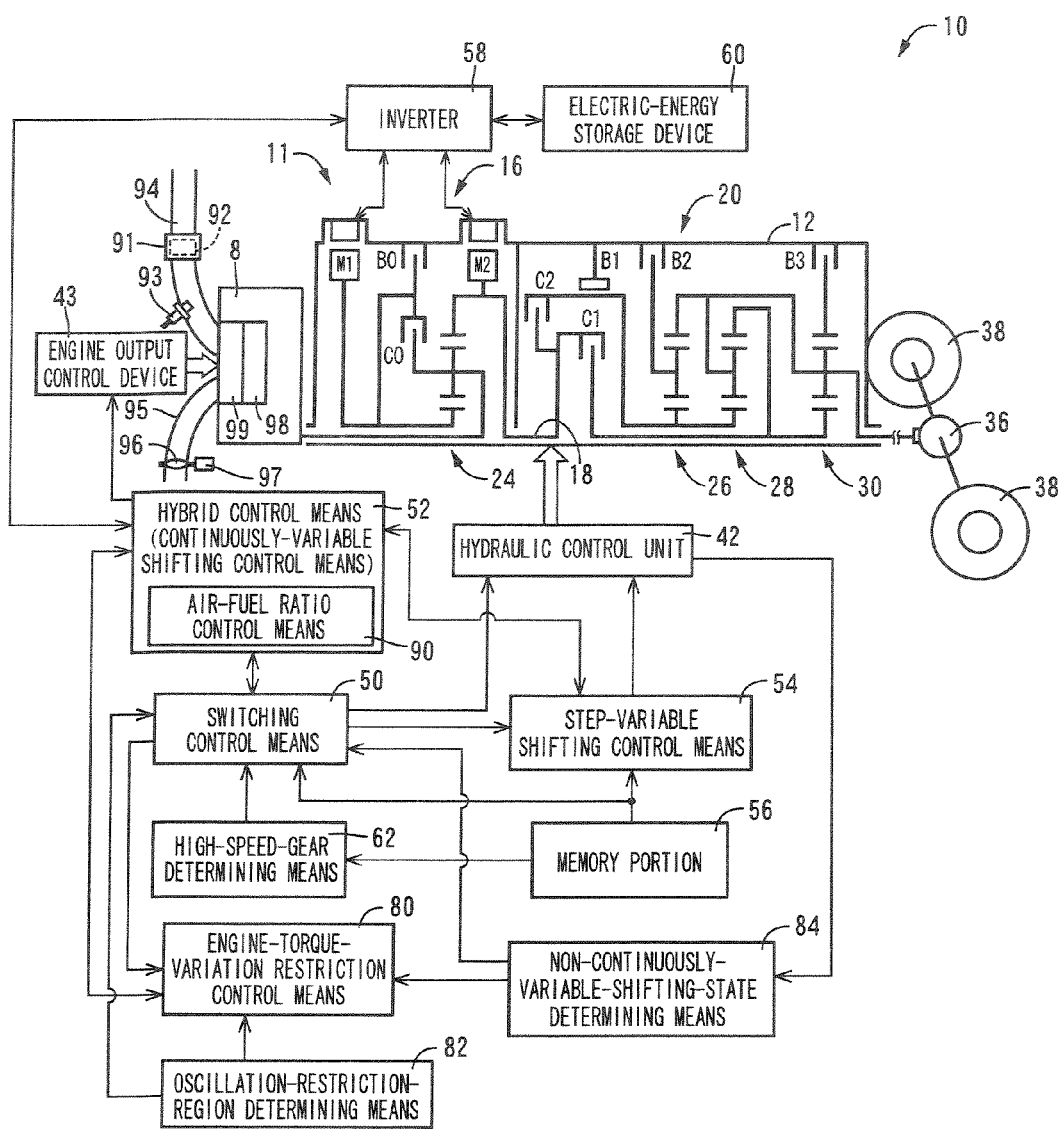
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, to which a control apparatus according to one embodiment of this invention is applicable. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a transmission portion functioning as a step-variable transmission in the form of an automatic transmission portion 20 disposed in a power transmitting path between the differential portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other, as described above. This direct connection means that the engine 8 and the transmission portion 11 are connected to each other, without a fluid-operated power transmitting device such as a torque converter or a fluid coupling being disposed therebetween, but may be connected to each other through the pulsation absorbing damper described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, and coupling devices in the form of a switching clutch C0 and a switching brake 31. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, that is, brought into a released state, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) functions as an electrically controlled differential device, and is placed in the continuously-variable shifting state (electrically established CVT state), in which the rotating speed of the power transmitting member 18 is continuously variable, irrespective of the rotating speed of the engine 8, namely, placed in the differential state in which a speed ratio γ0 (rotating speed of the input shaft 14/rotating speed of the power transmitting member 18) of the power distributing mechanism 16 is continuously changed from a minimum value γ0min to a maximum value γ0max, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged, that is, brought into an engaged state while the power distributing mechanism 16 is placed in the continuously-variable shifting state, the power distributing mechanism 16 is brought into a non-differential state in which the power distributing mechanism 16 does not perform the differential function. Described in detail, when the switching clutch C0 is engaged, the first sun gear S1 and the first carrier CA1 are connected together, so that the power distributing mechanism 16 is placed in a connected or locked state in which the three rotary elements of the first planetary gear set 24 consisting of the first sun gear S1, first carrier CA1 and first ring gear R1 are rotatable as a unit, namely, placed in the non-differential state in which the differential function is not available, so that the differential portion 11 is also placed in a non-differential state. In this non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1.

When the switching brake B0 is engaged in place of the switching clutch C0, the first sun gear S1 is fixed to the casing 12, so that the power distributing mechanism 16 is placed in the connected or locked state in which the first sun gear S1 is not rotatable, namely, placed in the non-differential state in which the differential function is not available, so that the differential portion 11 is also placed in the non-differential state. Since the rotating speed of the first ring gear R1 is made higher than that of the first carrier CA1, the differential portion 11 is placed in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state or non-locked state (non-connected state) and the non-differential state or locked state (connected state), that is, between the differential state in which the differential portion 11 (the power distributing mechanism 16) is operable as an electrically controlled differential device (for example, a continuously variable shifting state in which the differential portion 11 is operable as an electrically controlled continuously variable transmission the speed ratio of which is continuously variable), and a non-continuously-variable shifting state in which the differential portion 11 is not operable as the electrically controlled continuously variable transmission (for example, the locked state in which the differential portion 11 is not operable as a continuously variable transmission), namely, the fixed-speed-ratio shifting state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios. The non-connected state described above may include the partially engaged or slipping state of the switching clutch C0 or switching brake B0, as well as the fully released state of the switching clutch C0 or switching brake B0.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios p2, p3 and p4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is selectively placed in one of first-gear (first-speed) through fifth-gear (fifth-speed) positions, a reverse gear position (reverse drive position) and a neutral position, by selectively engaging the switching clutch C0, first clutch C1, second clutch C2, switching brake B0, first brake B1, second brake B2 and third brake B3, as indicated in the table of FIG. 2. The first-gear through fifth-gear positions have speed ratios γ (=input shaft speed $N_{IN}$/output shaft speed $N_{OUT}$) which change which change as geometric series. It is noted in particular that the power distributing mechanism 16 is provided with the switching clutch C0 and the switching brake B0 one of which is engaged to place the differential portion 11 in the continuously-variable shifting state in which the differential portion 11 is operable as a continuously variable transmission, or in the fixed-speed ratio shifting state in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states.

Where the transmission mechanism 10 functions as the step-variable transmission, for example, the first gear position having the highest speed ratio $\gamma 1$ of about 3.357, for example, is established by engaging actions of the switching clutch C0, first clutch C1 and third brake B3, and the second gear position having the speed ratio $\gamma 2$ of about 2.180, for example, which is lower than the speed ratio $\gamma 1$, is established by engaging actions of the switching clutch C0, first clutch C1 and second brake B2, as indicated in FIG. 2. Further, the third gear position having the speed ratio $\gamma 3$ of about 1.424, for example, which is lower than the speed ratio $\gamma 2$, is established by engaging actions of the switching clutch C0, first clutch C1 and first brake B1, and the fourth gear position having the speed ratio $\gamma 4$ of about 1.000, for example, which is lower than the speed ratio $\gamma 3$, is established by engaging actions of the switching clutch C0, first clutch C1 and second clutch C2. The fifth gear position having the speed ratio $\gamma 5$ of about 0.705, for example, which is smaller than the speed ratio $\gamma 4$, is established by engaging actions of the first clutch C1, second clutch C2 and switching brake B0. Further, the reverse gear position having the speed ratio $\gamma R$ of about 3.209, for example, which is intermediate between the speed ratios $\gamma 1$ and $\gamma 2$, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected one of the first, second, third and fourth gear positions, namely, the rotating speed of the power transmitting member 18 is continuously changed, so that the speed ratio of the drive system when the automatic transmission portion 20 is placed in the selected gear position is continuously variable over a predetermined range. Accordingly, the total speed ration (overall speed ratio) $\gamma T$ of the transmission mechanism 10 is continuously variable.

Figure 3:
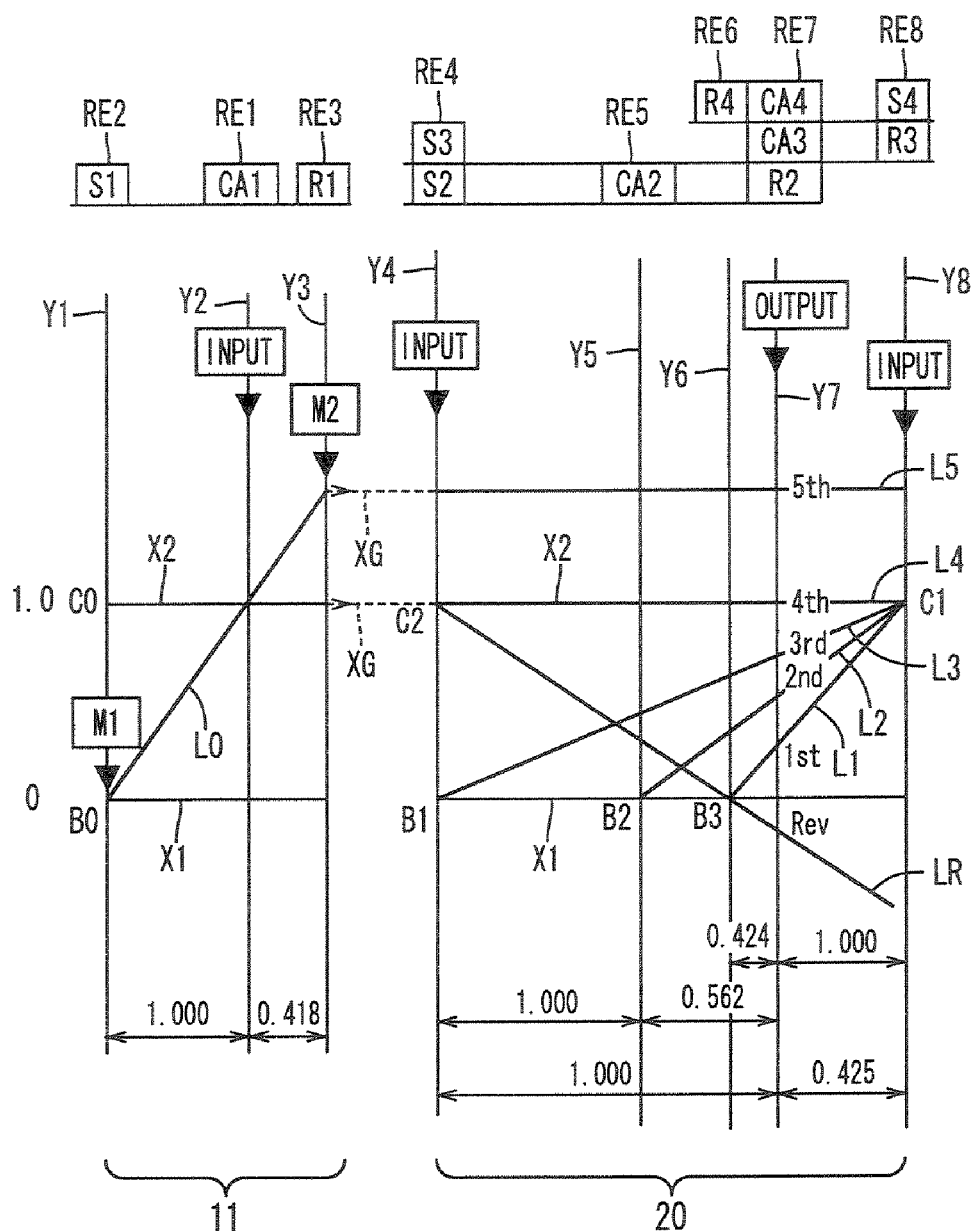
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. That is, the distance between the vertical lines Y1 and Y2 corresponds to "1", while the distance between the vertical lines Y2 and Y3 corresponds to the gear ratio $\rho 1$. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios p2, p3 and p4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio $\rho$. In the differential portion 11, the distance between the vertical lines Y1 and Y2 corresponds to "1", while the distance between the vertical lines Y2 and Y3 corresponds to the gear ratio $\rho$. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio $\rho$.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the rotating speed of the first electric motor M1, so that the rotating speed of the first carrier CA1 represented by a point of intersection between the straight line L0 and the vertical line Y2 is raised or lowered while the rotating speed of the first ring gear R1 which is determined by the vehicle speed V and which is represented by a point of intersection between the straight line L0 and the vertical line Y3 is held substantially constant. When the switching clutch C0 is engaged, the first sun gear S1 and the first carrier CA1 are connected to each other, and the power distributing mechanism 16 is placed in the non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the switching brake B0 is engaged, on the other hand, the rotary motion of the first sun gear S1 is stopped, and the power distributing mechanism 16 is placed in the non-differential state in which the power distributing mechanism 16 functions as the speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

The engine 8 is configured such that an operating air-fuel ratio (hereinafter referred to "air-fuel ratio") A/F (=intake air quantity/fuel supply quantity) is controllable. In a low-load running state of the vehicle, for instance, the engine 8 is operated in a lean-burn state in which the air-fuel ratio A/F is higher than the stoichiometric value, that is, in which an air-fuel mixture is in a fuel-lean state, so that the amount of consumption of the fuel is reduced. During starting or rapid acceleration of the vehicle, or in a medium-load or high-load running state of the vehicle, the engine 8 is operated in a rich-burn state in which the air-fuel ratio is close to or lower than the stoichiometric value, that is, in which the air-fuel mixture is in a fuel-rich state, so that the engine 8 provides a desired high output.

When the engine 8 is operated in the lean-burn state for improving the fuel economy of the vehicle, the concentration of oxygen contained in the exhaust gas becomes relatively high, and the absorption of nitrogen oxides NOx by an NOx absorbent 92 accommodated in a casing 91 disposed in an exhaust passage is promoted. However, the capacity of the NOx absorbent 92 to absorb NOx is limited, so that the NOx absorbing ability of the NOx absorbent 92 is saturated if the engine 8 is kept operated in the lean-burn state. Eventually, the NOx absorbent 92 becomes incapable of absorbing NOx. In view of this problem, a so-called "rich spike" is implemented to temporarily increase the air-fuel ratio A/F during operation of the engine 8 in the lean-burn state, so that NOx absorbed in the NOx absorbent 92 is released from the NOx absorbent 92. For example, the NOx absorbent 92 is formed of a carrier carrying: at least one element selected from alkali metals such as potassium K, sodium Na, lithium Li and, cesium Cs, alkali earth elements such as barium Ba and calcium Ca, and rare earth elements such as lanthanum La and yttrium Y; and a noble metal such as platinum Pt.

Figure 4:
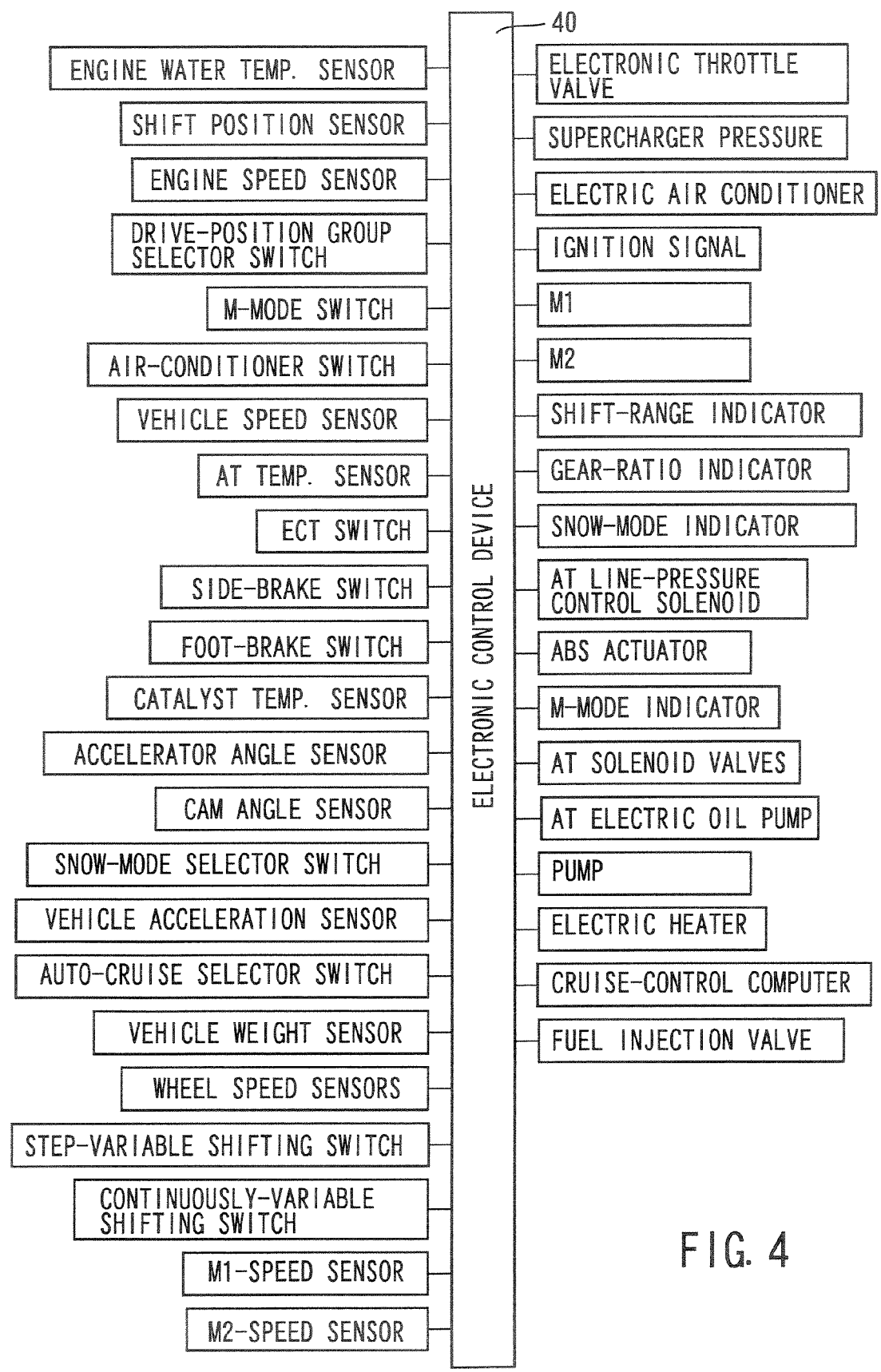
FIG. 4 is a view indicating input and output signals of an electronic control device of the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal 45; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the step-variable shifting state (locked state) in which the transmission mechanism 10 functions as a step-variable transmission; a signal indicative of a continuously-variable shifting switch provided to place the differential portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); a signal indicative of the air-fuel ratio A/F of the engine 8; and a signal indicative of an electric energy amount (amount of charging) SOC of a electric energy storage device 60 (shown FIG. 5).

The electronic control device 40 is further arranged to generate various signals such as: control signals to be applied to an engine output control device 43 (shown in FIG. 5) to control the output of the engine 8, such as a drive signal to drive a throttle actuator 97 for controlling an angle of opening $\theta_{TH}$ of an electronic throttle valve 96 disposed in a suction pipe 95 of the engine 8, a signal to control an amount of injection of a fuel by a fuel injecting device 98 into each cylinder of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever 46; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 5) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 is a functional block diagram for explaining major control functions of the electronic control device 40. A step-variable shifting control means 54 shown in FIG. 5 is arranged to determine whether a shifting action of the automatic transmission portion 20 should take place or not, that is, to determine the gear position to which the automatic transmission portion 20 should be shifted or not. This determination is made on the basis of a condition of the vehicle in the form of the vehicle speed V and an output torque $T_{OUT}$ of the automatic transmission portion 20, and according to a shifting boundary line map (shifting control map) which is stored in memory means 56 and which is a relationship indicated by solid lines and one-dot chain lines in FIG. 5. The step-variable shifting control means 54 generates commands (shifting control commands) to be applied to the hydraulic control unit 42, to selectively engage and release the respectively two hydraulically operated frictional coupling devices, for establishing the determined gear position of the automatic transmission portion 20 according to the table of FIG. 2.

A hybrid control means 52 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control means 52 calculates a target (required) vehicle output at the present running speed V of the vehicle, on the basis of the operating amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the rotating speed of the power transmitting member 18 determined by the vehicle speed V and the selected gear position of the transmission portion 20. That is, the hybrid control means 52 determines a target value of the overall speed ratio γT of the transmission mechanism 10, so that the engine 8 is operated according to a predetermined relationship stored in memory means, for example, according to a stored highest-fuel-economy curve (fuel-economy map). The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The predetermined relationship is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the differential portion 11, so as to obtain the target value of the overall speed ratio γT, so that the overall speed ratio YT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

The hybrid control means 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control means 52 is basically arranged to control the throttle actuator 97 on the basis of the operating amount $A_{CC}$ of the accelerator pedal and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$. The engine output control device 43 controls the throttle actuator 97 to open and close the electronic throttle valve 96, controls the fuel injecting device 98 to control the fuel injection, and controls the ignition device 99 to control the ignition timing of the igniter, for thereby controlling the torque of the engine 8, according to the commands received from the hybrid control means 52.

The hybrid control means 52 further includes air-fuel ratio control means 90 for controlling the air-fuel ratio A/F for operating the engine 8 in a selected one of the lean-burn and rich-burn states, to control the output of the engine 8.

For example, the air-fuel ratio control means 90 determines whether the vehicle is in a low-load running state predetermined by experimentation, for instance, in a constant-speed running state, in which the engine should be operated in the lean-burn state. This determination is made on the basis of the running condition of the vehicle as represented by the vehicle speed V, the accelerator pedal operating amount $A_{CC}$, the overall speed ratio γT of the transmission mechanism 10, whether the warm-up operation of the engine is completed or not, etc. If the air-fuel ratio control means 90 determines that the vehicle is in the predetermined low-load running state, the air-fuel ratio control means 90 controls the fuel supply quantity for a given value of the throttle valve opening angle $\theta_{TH}$ such that the fuel supply quantity is smaller than that of the stoichiometric air-fuel ratio A/F, so that the engine is operated in the lean-burn state.

Similarly, the determination is made by the air-fuel ratio control means 90, on the basis of the running condition of the vehicle, as to whether the vehicle is in a medium- or high-load running state predetermined by experimentation, for instance, in a starting state or in a rapidly accelerating state with a rapid depression of the accelerator pedal, in which the engine should be operated in the rich-burn state. If the air-fuel ratio control means 90 determines that the vehicle is in the predetermined medium- or high-load running state, the air-fuel ratio control means 90 controls the fuel supply quantity for the given value of the throttle valve opening angle $\theta_{TH}$ such that the fuel supply quantity is close to or larger than that of the stoichiometric air-fuel ratio A/F, so that the engine is operated in the rich-burn state.

The air-fuel ratio control means 90 controls the air-fuel ratio A/F of the engine 8 in a feedback fashion, on the basis of an air-fuel ratio A/F of the exhaust gas detected by an A/F ratio sensor 93 disposed in an exhaust pipe 94.

When the amount of NOx absorbed in the NOx absorbent 92 has increased to a predetermined upper limit, for example, to about 50% of the absorption capacity of the NOx absorbent 92, the air-fuel ratio control means 90 implements the rich spike to release the NOx from the NOx absorbent 92. Described in detail, the amount of NOx absorbed in the NOx absorbent 92 can be estimated from a cumulative value of a produce of the intake air quantity and the engine load in the lean-burn state. However, the amount of NOx absorbed in the NOx absorbent 92 may be in a simplified manner, from a cumulative value $\Sigma N_E$ of the engine speed. When the air-fuel ratio control means 90 determines that the cumulative value $\Sigma N_E$ of the engine speed in the lean-burn state has exceeded a predetermined upper limit $\Sigma N_E'$, the air-fuel ratio control means 90 determines that the rich spike should be implemented, and implements the rich spike to release the NOx from the NOx absorbent 92. For instance, the predetermined upper limit $\Sigma N_E'$ is a value of the cumulative value $\Sigma N_E$ of the engine speed at which the amount of NOx absorbed in the NOx absorbent 92 has increased to about 50% of the absorption capacity of the NOx absorbent 92. This value of the cumulative value $\Sigma N_E$ is obtained by experimentation.

Figure 6:
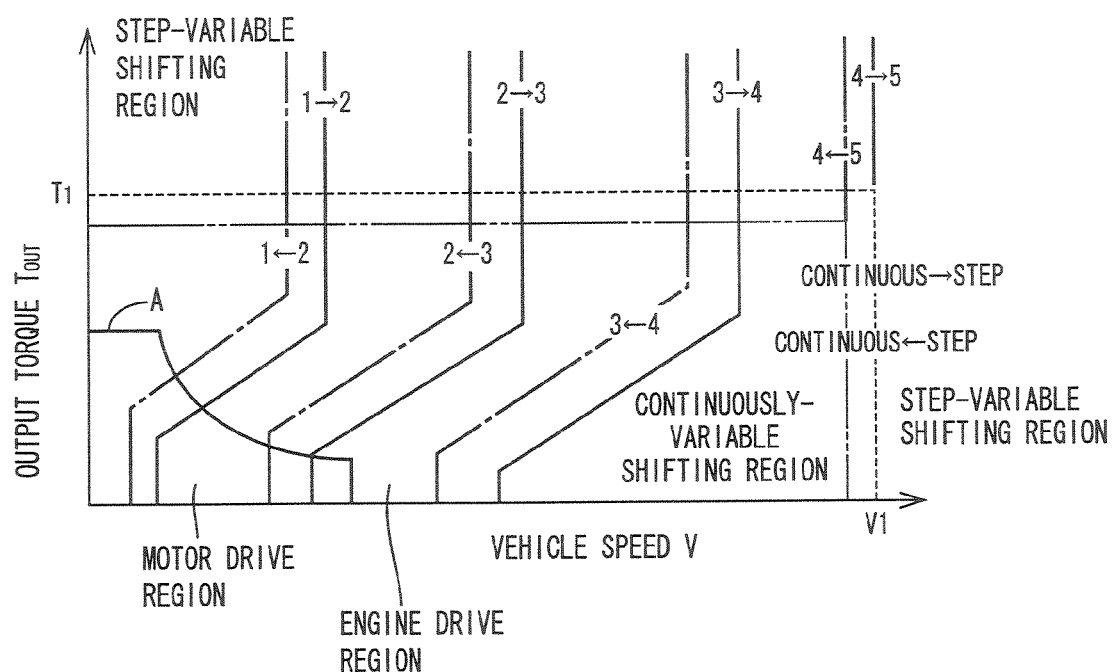
FIG. 6 is a view illustrating an example of a stored shifting boundary line map used for determining a shifting action of an automatic transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function of the differential portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal 45, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode. The torque assisting operation may be performed to increase the output torque of the second electric motor M2 in the motor drive mode.

The hybrid control means 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to hold the engine speed $N_E$ constant or to control the engine speed $N_E$ to a desired speed, irrespective of whether the vehicle is stationary or running, by controlling the first electric motor speed $N_{M1}$ and/or the second electric motor speed $N_{M2}$, owing to the electric CVT function of the differential portion 11. In other words, the hybrid control means 52 can control the first electric motor speed $N_{M1}$ and/or the second electric motor speed $N_{M2}$, to a desired value or values, while the engine speed $N_E$ is held constant or controlled to the desired speed. As is apparent from the collinear chart of FIG. 3, the hybrid control means 52 can raise the engine speed $N_E$ by raising the first electric motor speed $N_{M1}$ while the second electric motor speed $N_{M2}$ determined by the vehicle speed V is held substantially constant.

The high-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, for determining which one of the switching clutch C0 and brake B0 should be engaged to place the transmission mechanism 10 in the step-variable shifting state.

The switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state. The switching control means 50 places the transmission mechanism 10 in the continuously-variable shifting state or step-variable shifting state, depending upon whether the vehicle condition is in the continuously-variable shifting region or in the step-variable shifting region. Thus, the switching control means 50 limits the electrically controlled differential function of the differential portion 11 by placing the differential portion 11 in the step-variable shifting state by controlling the switching clutch C0 and/or the switching brake B0. That is, the switching control means 50 functions as differential limiting means for limiting the function of the differential portion 11 as the electrically controlled continuously variable transmission.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, 1B0, B1, B2 and B3, which are stored in the memory means 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanisms 10 should be shifted to the fifth gear position, the switching control means 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the differential portion 11 operable as the auxiliary transmission is placed in a selected one of two gear positions under the control of the switching control means 50 while the automatic transmission portion 20 connected in series to the differential portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the differential portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the automatic transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control means 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 6 will be described in detail. The shifting boundary line map or relationship (shifting control map) shown in FIG. 6 by way of example and stored in the memory means 56 is used for determining whether the automatic transmission portion 20 should be shifted or not, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map or relationship (switching control map) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1 or not. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value of the engine torque $T_E$, for example, calculated on the basis of the operating amount $A_{CC}$ of the accelerator pedal or the opening angle $\theta_{TH1}$ of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the above-indicated upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the above-indicated upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle, for example.

Figure 7:
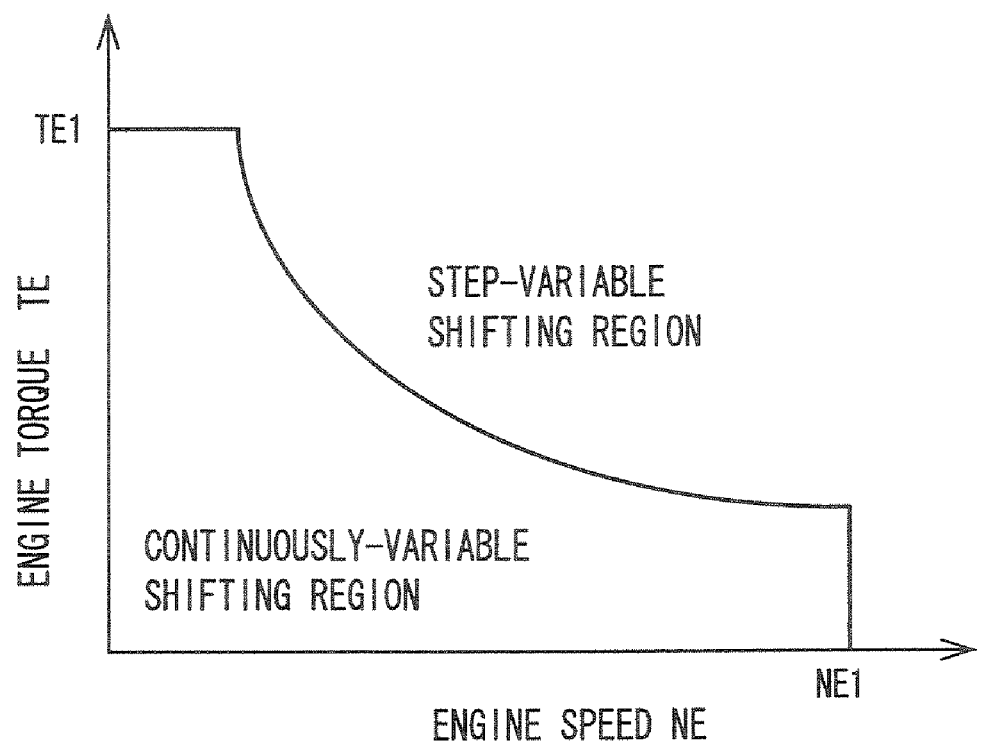
FIG. 7 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.
Figure 8:
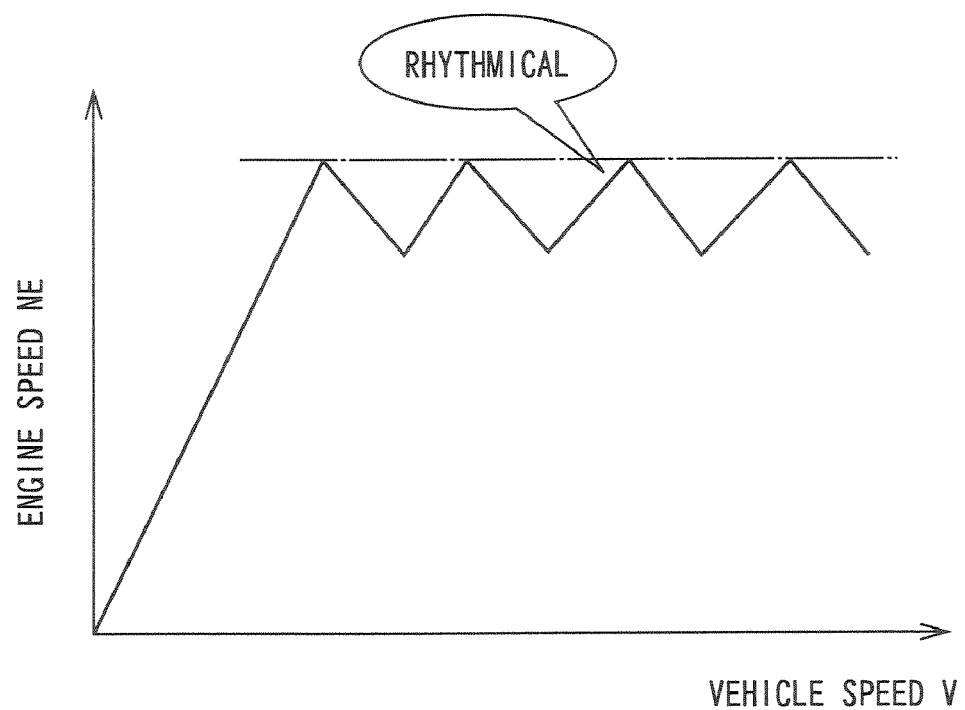
FIG. 8 is a view indicating an example of a change of the engine speed as a result of a shift-up action of the step-variable transmission.

Referring to FIG. 7, there is shown a switching boundary line map or relationship (switching control map) which is stored in the memory means 56 and which defines engine-output lines serving as boundary lines used by the switching control means 50 to determine whether the vehicle condition is in the step-variable or continuously-variable shifting region or not. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 7. In other words, the broken lines in FIG. 6 may be determined on the basis of the relation (map) of FIG. 7, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 7 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 7 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can generate the reaction torque corresponding to the engine torque $T_E$ when the engine output $T_E$ is not higher than the upper limit TE1, and the continuously-variable transmission portion 11 is placed in the step-variable shifting state when the vehicle is in the high-output running state in which the engine torque $T_E$ is higher than the upper limit TE1. In the step-variable shifting state of the transmission portion 11, the first electric motor M1 need not generate the reaction torque corresponding to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the required size of the first electric motor M1 can be reduced.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
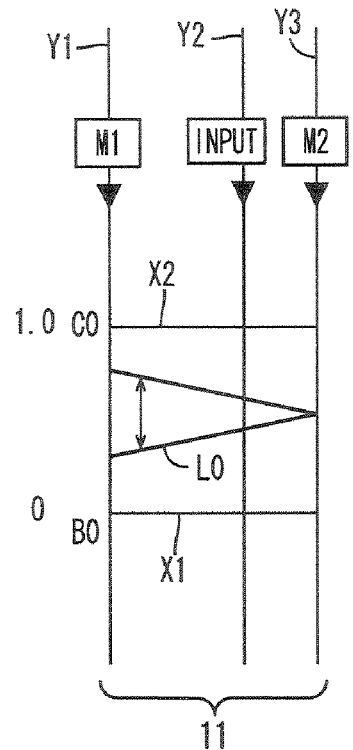
FIG. 9 is a view corresponding to a part of the collinear chart of FIG. 3 which shows a differential portion, the view showing the principle of a control operation of engine-torque-variation restriction control means to restrict an engine torque oscillation to be transmitted to drive wheels.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up, as indicated in FIG. 9.

In the present embodiment, the power transmitting path connecting the engine 8 to the drive wheels 28 does not include a fluid-operated power transmitting device such as a torque converter or a fluid coupling, so that a variation of the engine torque $T_E$ (hereinafter referred to as "engine torque variation") is more easily transmitted to the power transmitting member 18, that is, to the drive wheels 38, in the present embodiment, than in a vehicular drive system provided with a fluid-operated power transmitting device. Accordingly, there is a possibility of deterioration of the vehicle drivability due to a variation of the vehicle drive torque caused by the engine torque variation.

The engine torque variation may be caused by periodic oscillation (pulsation) which usually takes place due to periodic ignition (explosion) of the cylinders of the engine 8, and by a temporary increase of the engine torque $T_E$ by the rich spike implemented by the air-fuel ratio control means 90. There will be described control operations to restrict the engine torque variation to be transmitted to the power transmitting member 18 (drive wheels 38) due to engine torque oscillation caused by the ignition of the cylinders, and the engine torque variation to be transmitted to the power transmitting member 18 due to the temporary engine torque variation caused by the rich spike.

Engine-torque-variation restriction control means 80 is provided to command the hybrid control means 52 to vary the first electric motor speed $N_{M1}$ in synchronization with the engine torque oscillation, for restricting the engine torque oscillation to be transmitted to the power transmitting member 18 due to the ignition of the cylinders. As a result, the amount of the engine torque oscillation to be transmitted to a downstream portion of the power transmitting path, such as the power transmitting member 18, output shaft 22 and drive wheels 38, is reduced to improve the vehicle drivability.

FIG. 9 is a view corresponding to a part of the collinear chart of FIG. 3 which shows the differential portion 11. This view shows the principle of the control operation of the engine-torque-variation restriction control means 80 to restrict the engine torque oscillation to be transmitted to the power transmitting member 18. The engine torque oscillation is prevented from being transmitted to the downstream portion of the power transmitting path, by varying the first electric motor speed $N_{M1}$ in synchronization with the engine torque oscillation, as indicated by arrow-headed line. Namely, the first electric motor M1 is controlled so as not to generate a reaction torque corresponding to a torque variation caused by the engine torque oscillation, for thereby preventing the engine torque oscillation from being transmitted to the downstream portion of the power transmitting path. The first electric motor speed $N_{M1}$ is varied so that the first electric motor M1 does not generate the reaction torque corresponding to the torque variation caused by the engine torque oscillation. Considered from another point of view, the first electric motor speed $N_{M1}$ varies in synchronization with the engine torque oscillation, as a result of preventing the first electric motor M1 from generating the reaction torque corresponding to the torque variation.

Thus, the engine-torque-variation restriction control means 80 is configured to vary the first electric motor speed $N_{M1}$ in synchronization with the engine torque oscillation, by utilizing the electric CVT function (differential operation) of the differential portion 11, for thereby restricting the transmission of the engine torque oscillation due to the ignition of the engine cylinders, to the power transmitting member 18, that is, for thereby restricting the variation of the torque to be transmitted to the power transmitting member 18, in the presence of the engine torque oscillation.

The vehicle drivability is deteriorated due to the engine torque oscillation caused by the ignition of the cylinders, particularly while the vehicle is running quietly at a low speed with the engine operating at a low speed. That is, the engine torque oscillation to be transmitted to the power transmitting member 18 (drive wheels 38) due to the ignition of the cylinders must be restricted when the vehicle running condition is in a predetermined oscillation restriction region in which the engine torque oscillation causes the above-indicated problem. This predetermined oscillation restriction region of the vehicle running condition is a region in which the vehicle running speed is relatively low while the engine speed is relatively low.

Oscillation-restriction-region determining means 82 is provided to determine whether the vehicle running condition is in the predetermined oscillation restriction region in which the engine torque oscillation to be transmitted to the power transmitting member 18 due to the ignition of the engine cylinders must be restricted by the engine-torque-variation restriction control means 80. For example, the oscillation-restriction-region determining means 82 is configured to make the determination as to whether the vehicle running condition is in the predetermined oscillation restriction region, by determining whether the vehicle running speed is lower than a predetermined threshold V' while the engine speed is lower than a predetermined threshold $N_E'$. When the oscillation-restriction-region determining means 82 has determined that the vehicle running condition is in the oscillation restriction region, the engine-torque-variation restriction control means 80 varies the first electric motor speed $N_{M1}$ in synchronization with the engine torque oscillation. The predetermined threshold values V' and $N_E'$ are lower limits obtained by experimentation, below which the vehicle drivability is deteriorated due to the engine torque oscillation caused by the ignition of the engine cylinders.

The engine-torque-variation restriction control means 80 is alternatively configured or further configured to command the hybrid control means 52 to control the engine torque $T_E$ to be distributed to the first electric motor M1 and to be transmitted as an electric energy to the second electric motor M2, that is, to control the torque to be transmitted through the electric path, for thereby restricting the transmission of the engine torque variation to the power transmitting member 18, that is, for thereby restricting the variation of the torque to be transmitted to the power transmitting member 18, in the presence of the engine torque variation. The torque to be transmitted through the electric path is based on the engine torque $T_E$ which is transmitted to the first electric motor M1 and which is converted into an electric energy that is supplied through the inverter 58 directly to the second electric motor M2 or that is supplied through the inverter 58 to the second electric motor M2 indirectly from the electric energy storage device in which the electric energy is once stored.

Described in detail, the engine torque $T_E$ is divided by the differential portion 11 into the torque mechanically transmitted to the power transmitting member 18, that is, a mechanical path torque, and the torque transmitted to the power transmitting member 18 through the electric path, that is, an electric path torque. Like the engine torque $T_E$, the engine torque variation is divided into a mechanical path torque component and an electric path torque component, which are transmitted to the drive wheels 38. The engine torque to be transmitted to the drive wheels 38 can be restricted by restricting a component of the engine torque variation which corresponds to the engine path torque component.

For example, the engine-torque-variation restriction control means 80 is configured to limit or chop off the electric path torque component by storing the above-described electric energy in the electric energy storage device 60, for thereby restricting, for instance, smoothing the component of the engine torque variation corresponding to the electric path torque component. In other words, the engine-torque-variation restriction control means 80 is arranged to set an upper limit of the electric path torque component, and stores in the electric energy storage device 60 a component of the engine torque variation which exceeds the upper limit of the electric path torque component and which is not transmitted to the second electric motor M2, so that the portion of the engine torque variation corresponding to the electric path torque component is restricted.

Alternatively, the engine-torque-variation restriction control means 80 is configured to control the electric path torque component by supplying the electric energy from the electric energy storage device 60, for thereby restricting, for instance, smoothing the component of the engine torque variation corresponding to the electric path torque component. In other words, the engine-torque-variation restriction control means 80 is arranged to supply the electric energy from the electric energy supply device 60 to compensate for the component of the engine torque variation corresponding to the electric path torque component not larger than the upper limit, so that the portion of the engine torque variation corresponding to the electric path torque component is restricted.

Figure 10:
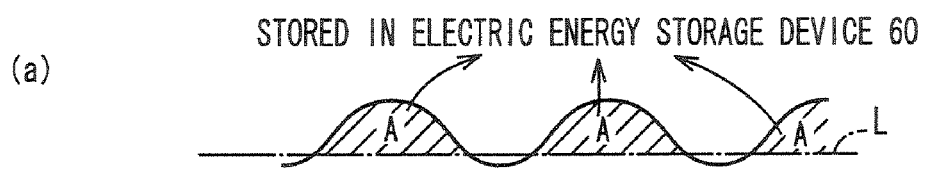
FIG. 10 is a view indicating an electric path torque component of the engine torque oscillation due to ignition of the engine cylinders, showing at (a) a component A of an engine torque variation corresponding to the electric path torque component which is larger than an upper limit of the electric path torque indicated by one-dot chain line and which is to be stored in an electric energy storage device, and at (b) an electric energy supplied from the electric energy storage device to compensate for the component A of the engine torque variation corresponding to the electric path torque component which is not larger than the upper limit of the electric path torque indicated by the one-dot chain line.
Figure 10:
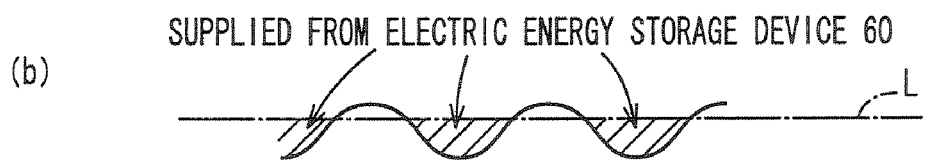

FIG. 10 indicates the electric path torque component of the engine torque oscillation due to the ignition of the engine cylinders, and shows at (a) the component A of the engine torque variation corresponding to the electric path torque component which is larger than the upper limit indicated by one-dot chain line L and which is to be stored in the electric energy storage device 60

FIG. 10 shows at (b) an electric energy supplied from the electric energy storage device 60 to compensate for the component A of the engine torque variation corresponding to the electric path torque component which is not larger than the upper limit indicated by the one-dot chain line L.

Alternatively, the engine-torque-variation restriction control means 80 is configured to limit or chop off the electric path torque component by storing the above-described electric energy in the electric energy storage device 60, for thereby restricting the engine torque variation (increase) corresponding to the electric path torque component, upon generation of the temporary engine torque variation (increase) due to the rich spike which is implemented under the control of the air-fuel ratio control means 90, for instance. In another point of view, the engine-torque-variation restriction control means 80 is arranged to restrict a variation of the first electric motor speed $N_{M1}$ by increasing a load of the first electric motor M1 to generate the electric energy during the rich spike, for thereby storing the electric energy generated by the first electric motor M1, in the electric energy storage device 60, so that a variation of the rotating speed of the power transmitting member 18 due to the rich spike is restricted.

Alternatively, the engine-torque-variation restriction control means 80 is configured to not only restrict the engine torque variation corresponding to the electric path torque component for restricting the engine torque variation to be transmitted to the drive wheels 38, but also control the electric path torque component so as to offset the engine torque variation corresponding to the electric path toque component, for further restricting the engine torque variation to be transmitted to the drive wheels 38.

For instance, the engine-torque-variation restriction control means 80 is operable upon generation of the temporary engine torque variation (increase) caused by the rich spike, to not only limit the electric path torque component for restricting the engine torque variation (increase) corresponding to the electric path torque, but also control (reduce) the electric path torque component by storing the above-described electric energy in the electric energy storage device 60 so as to offset the engine torque variation (increase) corresponding to the mechanical path torque component, for thereby further restricting the engine torque variation to be transmitted to the drive wheels 38.

While the control operations of the engine-torque-variation restriction control means 80 to restrict the engine torque variation to be transmitted to the drive wheels 38 have been described in connection with the engine torque oscillation caused by the ignition of the cylinders, and the engine torque variation due to the temporary engine torque variation caused by the rich spike, the control operations are performed by utilizing the electric CVT function (differential operation) of the differential portion 11, or the transmission of the electric energy through the electric path. Therefore, the control operations of the engine-torque-variation restriction control means 80 must be performed in the differential state of the differential portion 11.

However, the transmission mechanism 10 (differential portion 11 or power distributing mechanism 16) according to the present embodiment is switchable between the continuously-variable shifting state (differential state) and the step-variable shifting state (locked state), and is switched to one of the continuously-variable and step-variable shifting states, which is selected by the switching control means 50 depending upon the vehicle state. In the step-variable shifting state of the differential portion 11, the engine-torque-variation restriction control means 80 is not operated to restrict the engine torque variation to be transmitted to the drive wheels 38, so that there is a possibility of deterioration of the vehicle drivability.

In view of the drawback described above, the switching control means 50 is further configured to switch the differential portion 11 from the non-continuously-variable shifting state (e.g., step-variable shifting state) to the continuously variable state, for example, to temporarily place the differential portion 11 in its continuously-variable shifting state, for thereby enabling the engine-torque-variation restriction control means 80 to control the electric energy to be supplied to the second electric motor M2, that is, to control the electric path torque.

For instance, the switching control means 50 is operated upon determination of the air-fuel ratio control means 90 that the rich spike should be implemented during vehicle running in the step-variable shifting state of the differential portion 11. In this case, the switching control means 50 switches the differential portion 11 to the continuously-variable shifting state, for enabling the engine-torque-variation restriction control means 80 to control the electric path torque. Alternatively, the switching control means 50 operated upon determination by the oscillation-restriction-region determining means 82 that the condition of the vehicle running in the step-variable shifting state of the differential portion 11 is in the oscillation restriction region. In this case, the switching control means 50 switches the differential portion to the continuously-variable shifting state, for enabling the engine-torque-variation restriction control means 80 to control the electric path torque.

During the vehicle running with the differential portion 11 placed in the step-variable shifting state, the engine-torque-variation restriction control means 80 controls the electric-path torque only after the differential 11 is first switched to the continuously-variable shifting state under the control of the switching control means 50.

Non-continuously-variable-shifting-state determining means 84 is provided to determine whether the differential portion 11 is presently placed in the non-continuously-variable shifting state or not. For example, this determination is made by determining whether the switching clutch C0 or switching brake B0 is held in the engaged state by the hydraulic control unit 42 according to a command from the switching control means 50 to engage the switching clutch C0 or brake B0.

Figure 11:
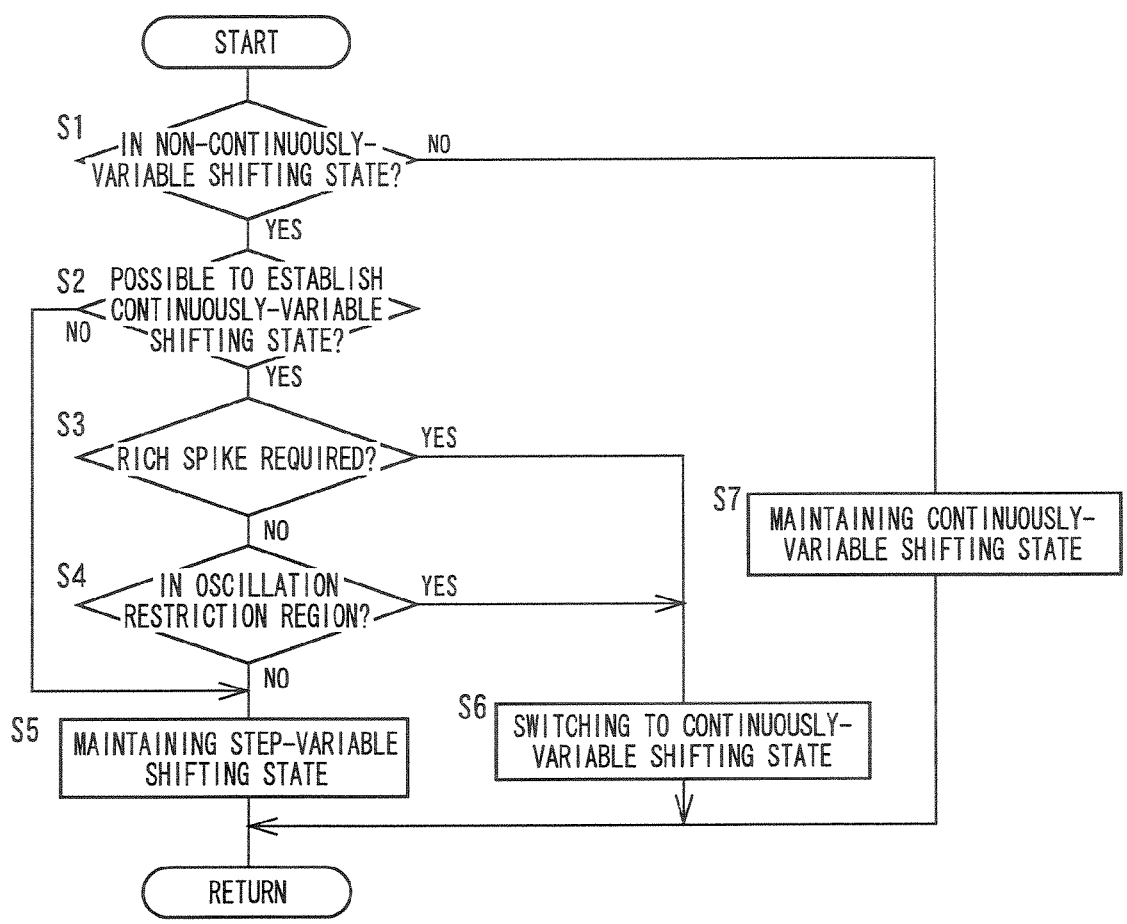
FIG. 11 is a flow chart illustrating a control routine executed by the electronic control device of FIG. 5, more specifically, a control operation of the engine-torque-variation restriction control means during vehicle running in the non-continuously-variable shifting state, to control the electric path torque.

FIG. 11 is a flow chart illustrating a control routine executed by the control operation of the electronic control device 40, more specifically, the control operation of the engine-torque-variation restriction control means 80 during vehicle running in the non-continuously-variable shifting state, to control the engine torque to be transmitted to the second electric motor M2, that is, to control the electric path torque. This control routine is repeatedly executed with a extremely short cycle time of several milliseconds to several tens of milliseconds.

Figure 12:
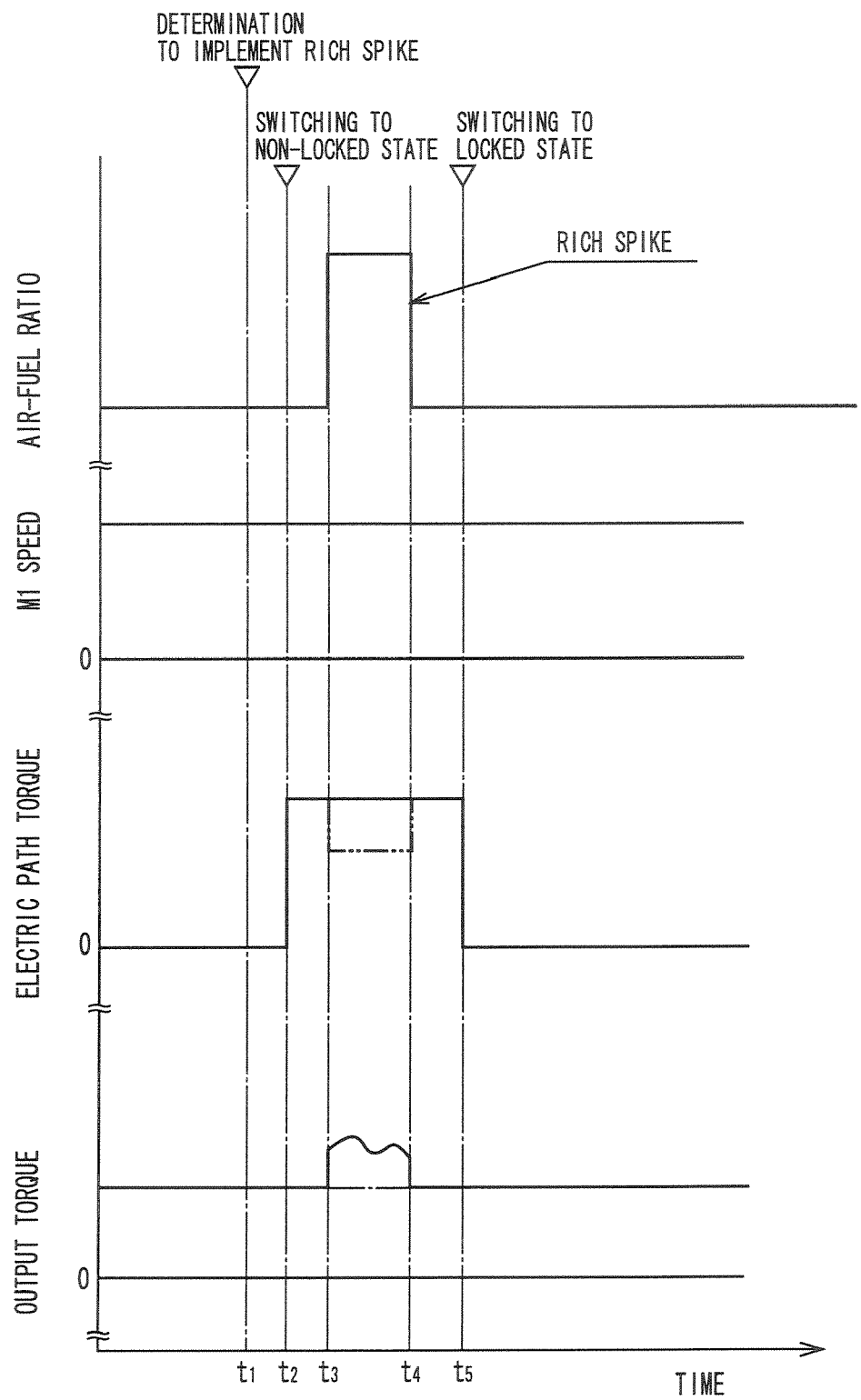
FIG. 12 is a time chart for explaining the control operation illustrated in the flow chart of FIG. 11, in the case of determination to implement a rich spike during the vehicle running in the non-continuously-variable shifting state.

FIG. 12 is a time chart for explaining the control operation illustrated in the flow chart of FIG. 11, in the case of the determination to implement the rich spike during the vehicle running in the non-continuously-variable shifting state.

Figure 13:
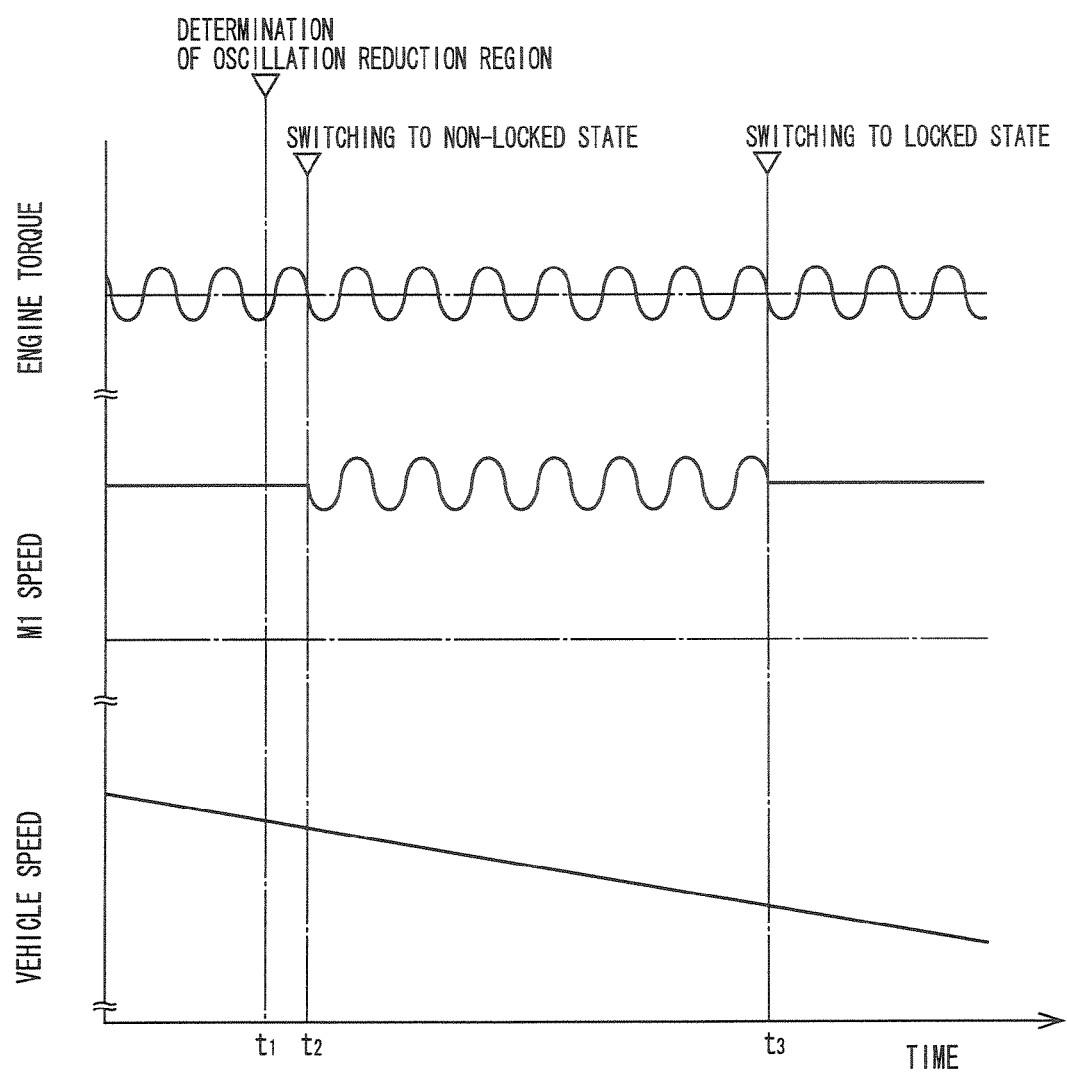
FIG. 13 is a time chart for explaining the control operation illustrated in the flow chart of FIG. 11, in the case of determination of the vehicle running in an oscillation restriction region in the non-continuously-variable shifting state.

FIG. 13 is a time chart for explaining the control operation illustrated in the flow chart of FIG. 11, in the case of the determination of the vehicle running in the oscillation restriction region in the non-continuously-variable shifting state.

The control routine of FIG. 12 is initiated with step S1 ("step" being hereinafter omitted) corresponding to the non-continuously-variable-shifting-state determining means 84, to determine whether the differential portion 11 is presently placed in the non-continuously-variable shifting state or not. For example, this determination is made by determining whether the switching clutch C0 or switching brake B0 is held in the engaged state by the hydraulic control unit 42 according to the command from the switching control means 50 to engage the switching clutch C0 or brake B0. If a negative determination is obtained in S1, the control flow goes to S7 corresponding to the switching control means 50, to hold the differential portion 11 in the continuously-variable shifting state, and the present control routine is terminated.

If an affirmative determination is obtained in S1, the control flow goes to S2 corresponding to the switching control means 50, to determine whether it is possible to switch the differential portion 11 to the continuously-variable shifting state. Upon detection of any defect or functional deterioration of any control components such as the electric motors which enable the differential portion 11 to be operable as the electrically controlled continuously variable transmission, for instance, it is determined that the differential portion 11 cannot be switched to the continuously-variable shifting state. It is determined that the differential portion 11 cannot be switched to the continuously-variable shifting state, also when the required engine torque is excessively large. However, it is determined that the differential portion 11 can be switched to the continuously-variable shifting state, if the temporary switching to the continuously-variable shifting state is possible even when the required engine torque is excessively large.

If an affirmative determination is obtained in S2, the control flow goes to S3 corresponding to the air-fuel ratio control means 90, to determine whether the rich spike should be implemented. If a negative determination is obtained in S3, the control flow goes to S4 corresponding to the oscillation-restriction-region determining means 82, to determine whether the vehicle running condition is in the predetermined oscillation restriction region.

In the example of FIG. 12, the determination to implement the rich spike is made at a point of time t1. In the example of FIG. 13, the determination that the vehicle running condition changes into the oscillation restriction region as a result of a decrease of the vehicle speed V is made at a point of time t1.

If a negative determination is obtained in S2 or S4, the control flow goes to S5 corresponding to the switching control means 50, to hold the differential portion 11 in the step-variable shifting state, and the present control routine is terminated.

If an affirmative determination is obtained in S3 or S4, the control flow goes to S6 corresponding to the switching control means 50, to switch the differential portion 11 to the continuously-variable shifting state, for example, to temporarily place the differential portion 11 in the continuously-variable shifting state, for enabling the engine-torque-restriction control means 80 to control the electric path torque.

The above-indicated step S6 is followed by a step (not shown) corresponding to the engine-torque-variation restriction control means 80, in which the engine torque variation to be transmitted to the drive wheels 38 due to the rich spike implemented or due to the ignition of the engine cylinders is restricted.

In the example of FIG. 12, the differential portion 11 is switched to the continuously-variable shifting state (non-locked state) at a point of time t2, to permit transmission of en electric energy through the electric path, and the rich spike is implemented in the continuously-variable shifting state, during a time period from a point of time t3 to a point of time t4. To restrict the engine torque variation to be transmitted to the drive wheels 38 due to the rich spike, the electric path torque (indicated by solid line) is kept substantially constant during a time period from the point of time t2 to a point of time t5, which time period includes the time period between the points of time t3 and t4 during which the rich spike is implemented. Namely, the electric path torque is limited such that a portion of the electric path torque which is not transmitted to the drive wheels 38 is stored in the electric energy storage device 60. To offset the engine torque variation which is included in the mechanical path torque due to the rich spike, the electric path torque may be reduced during the time period between the points of time t3 and t4, as indicated by two-dot chain line. In this case, the engine torque variation to be transmitted to the drive wheels 38 can be further restricted. In the example of FIG. 12, the differential portion 11 is switched back to the step-variable shifting state at the point of time t5, so that the differential portion 11 is held in the continuously-variable shifting state during the time period between the points of time t2 and t5. However, after the completion of the rich spike (after the point of time t4), the shifting state of the differential portion 11 may be selected depending upon the running condition of the vehicle.

In the example of FIG. 13, the differential portion 11 is switched to the continuously-variable shifting state (non-locked state) at a point of time t2, to permit the differential portion 11 to perform the differential function. To restrict the engine torque oscillation to be transmitted to the drive wheels 38 due to the periodic ignition of the engine cylinders, the first electric motor speed $N_{M1}$ is varied in synchronization with the engine torque oscillation, during a time period from the point of time t2 to a point of time t3. In the present example of FIG. 13, the need to restrict the engine torque oscillation to be transmitted to the drive wheels 38 has been eliminated at the point of time t3, and the differential portion 11 is switched back to the step-variable shifting state at the point of time t3, so that the differential portion 11 is held in the continuously-variable shifting state during the time period between the points of time t2 and t3. However, after the need to restricted the engine torque oscillation (after the point of time t3), the shifting state of the differential portion 11 may be selected depending upon the running condition of the vehicle.

In the present embodiment, the engine-torque-variation restriction control means 80 is configured to control the electric energy to be supplied to the second electric motor M2 in the continuously-variable shifting state of the differential portion 11, so that a variation of the transmission torque to be transmitted to the power transmitting member 18 is restricted, irrespective of a variation of the output torque of the engine, whereby the engine torque variation to be transmitted to the drive wheels 38 is restricted to improve the vehicle drivability.

The present embodiment is further arranged such that the switching control means 50 is operable, when the differential portion 11 is placed in the non-continuously-variable shifting state, for example, in the step-variable shifting state, to switch the differential portion 11 to the continuously-variable shifting state, for enabling the engine-torque-variation restriction control means 80 to control the electric energy to be supplied to the second electric motor M2, that is, to control the electric path torque, so that the electric energy to be supplied to the second electric motor M2 is controlled by the engine-torque-variation restriction control means 80, whereby the vehicle drivability is improved.

The present embodiment is further arranged such that the engine-torque-variation restriction control means 80 limits the electric energy to be supplied to the second electric motor M2, while the output torque of the engine is varying due to the rich spike implemented by the air-fuel ratio control means 90. Accordingly, even in the event of a variation of the engine torque due to the rich spike, the engine torque variation to be transmitted to the drive wheels 38 is restricted, so that the vehicle drivability is improved.

The present embodiment is further arranged such that the engine-torque-variation restriction control means 80 limits the electric energy to be supplied to the second electric motor M2, while the output torque of the engine is varying due to the rich spike implemented by the air-fuel ratio control means 90. Accordingly, even in the event of a variation of the engine torque due to the rich spike, the engine torque variation to be transmitted to the drive wheels 38 is restricted, so that the vehicle drivability is improved.

The present embodiment is further arranged such that the engine-torque-variation restriction control means 80 varies the first electric motor speed $N_{M1}$ in synchronization with engine torque oscillation caused by the ignition of the engine cylinders, to thereby restrict the engine torque oscillation to be transmitted to the power transmitting member 18. In this case, the torque oscillation of the engine is less likely to be transmitted to the downstream portion of the power transmitting path, such as the power transmitting member 18, output shaft 22 and the vehicle drive wheels 34, so that the vehicle drivability is improved.

Other embodiments of the present invention will be described. In the following descriptions, the same reference as used in the preceding embodiment signs will be used to identify the corresponding elements which will not be described.

Embodiment 2

Figures 14, 15:
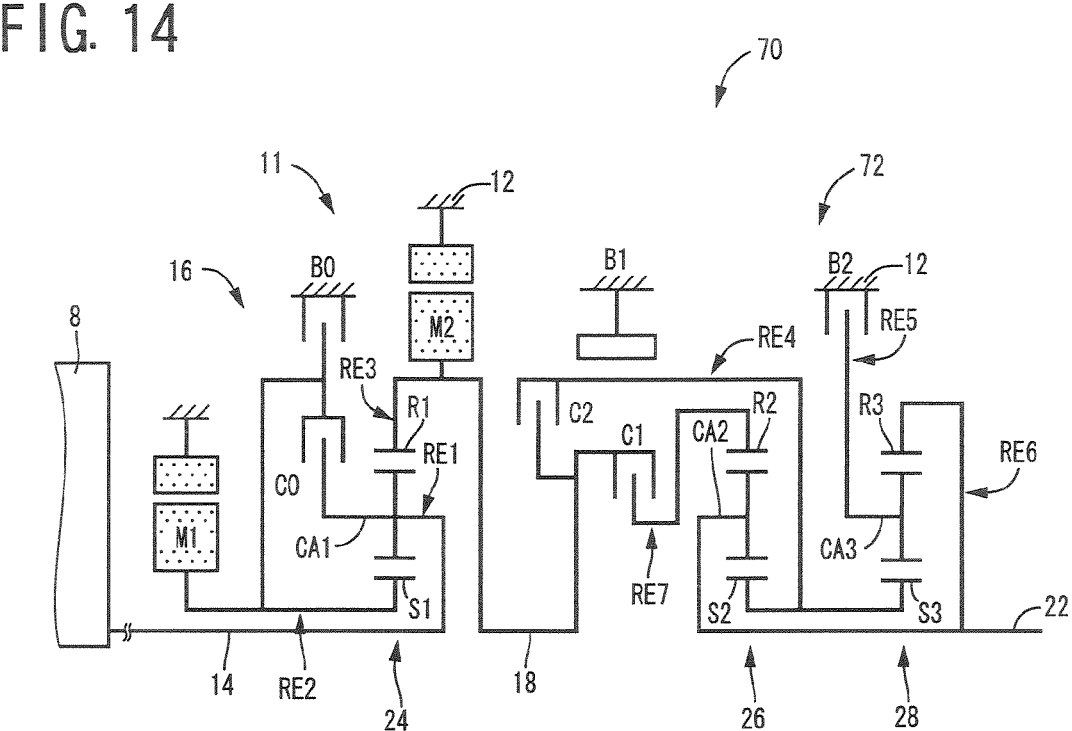
FIG. 14 is a schematic view for explaining an arrange of a hybrid vehicle drive system constructed another embodiment of this invention.
FIG. 15 is a table corresponding to that of FIG. 2, indicating shifting actions of the hybrid vehicle drive system of FIG. 14 in a selected one of the continuously-variable and step-variable shifting states, in relation to different combinations of operating states of hydraulically operated frictional coupling devices to effect the respective shifting actions.
Figure 16:
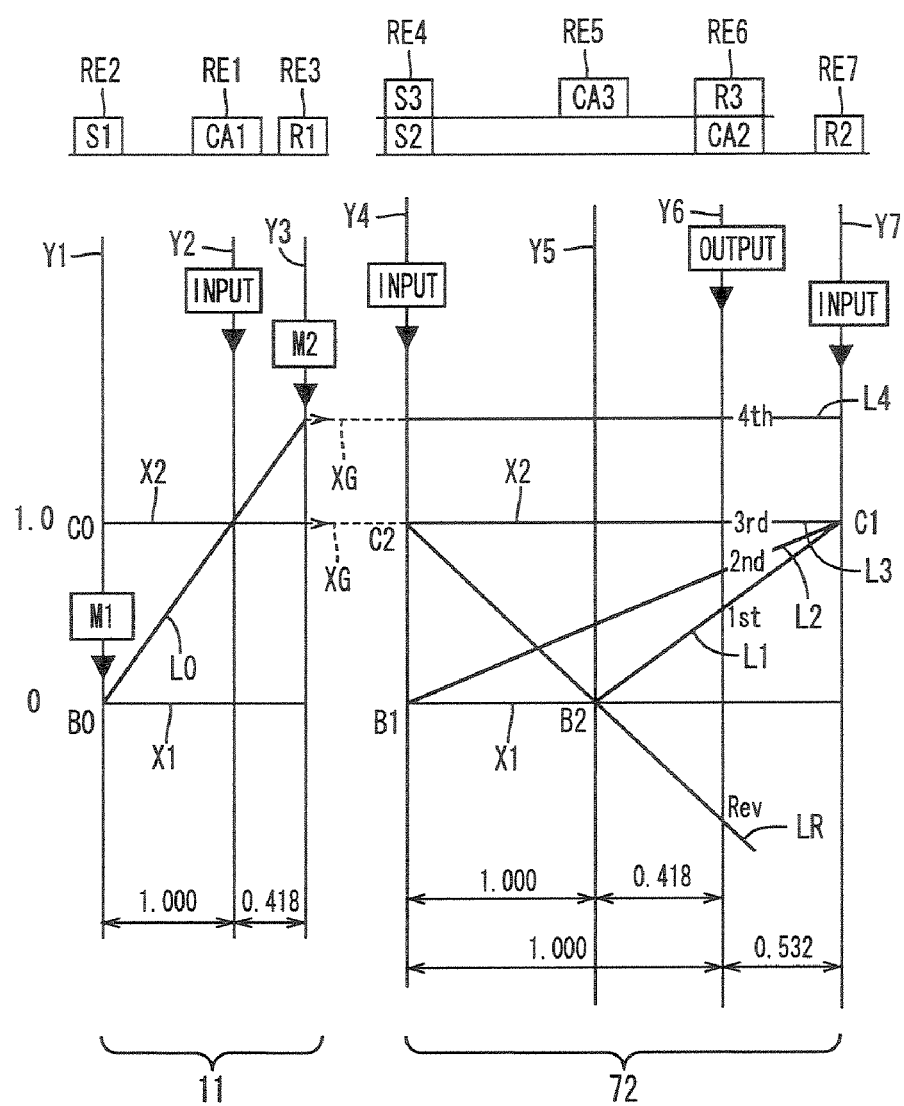
FIG. 16 is a collinear chart corresponding to that of FIG. 3, indicating relative rotating speeds of the rotary elements of the hybrid vehicle drive system of FIG. 14 in the step-variable shifting state, in the different gear positions.

Referring to the schematic view of FIG. 14, there is shown an arrangement of a transmission mechanism 70 in another embodiment of this invention, and FIG. 15 a table indicating a relationship between the gear positions of the transmission mechanism 70 and different combinations of engaged states of the hydraulically operated frictional coupling devices for respectively establishing those gear positions, while FIG. 16 is a collinear chart for explaining a shifting operation of the transmission mechanism 70.

The transmission mechanism 70 includes the differential portion 11 having the first electric motor M1, power distributing mechanism 16 and second electric motor M2, as in the preceding embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22 through the power transmitting member 18. The power distributing mechanism 16 includes the single-pinion type first planetary gear set 24 having a gear ratio $\rho 1$ of about 0.418, for example, and the switching clutch C0 and the switching brake B0. The automatic transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 14. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the differential portion 11 which is placed in the fixed-speed-ratio shifting state by engagement of the switching clutch C0 or switching brake B0. Further, a continuously variable transmission is constituted by the transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 15. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 15, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the total speed ratio of the automatic transmission portion 72 is continuously variable across the adjacent gear positions, whereby the overall speed ratio γT of the transmission mechanism 70 a whole is continuously variable.

The collinear chart of FIG. 16 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 16 indicates the rotating speeds of the individual elements of the power distributing mechanism 16 11 when the switching clutch C0 and brake B0 are both released, and the rotating speeds of those elements when the switching clutch C0 or brake B0 is engaged, as in the preceding embodiment.

In FIG. 16, four vertical lines Y4, Y5, Y6 and Y7 corresponding to the automatic transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 16. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the differential portion 11 functioning as the continuously-variable shifting portion or first shifting portion, and the automatic transmission portion 72 functioning as the step-variable (automatic) shifting portion or second shifting portion, and the output shaft 22 is provided with the third electric motor M3, so that the present transmission mechanism 70 has advantages similar to those of the first embodiment.

Embodiment 3

Figure 17:
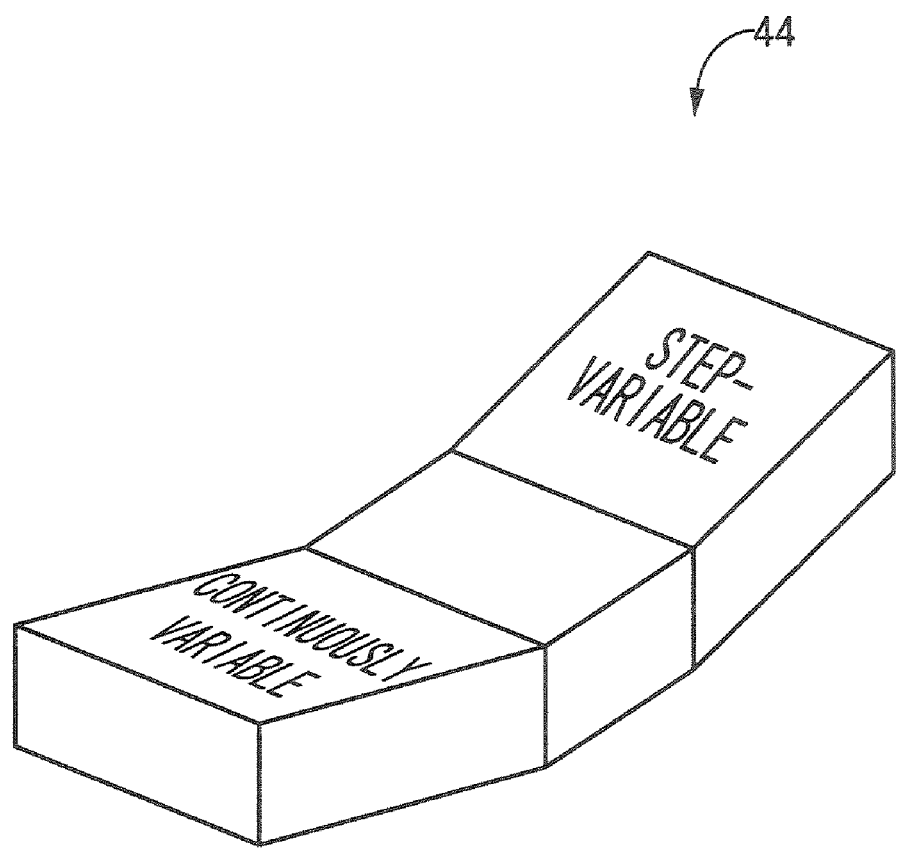
FIG. 17 is a view showing an example of a manually operable shifting-state selecting device in the form of a seesaw switch operated by a user to select the shifting state.

FIG. 17 shows an example of a seesaw switch 44 (hereinafter referred to as "switch 44") functioning as a shifting-state selecting device manually configured to be operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 17. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10, 70 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

If the step-variable shifting state of the transmission mechanism 10 is selected by the switch 44 during running of the vehicle, the differential portion 11 is switched to the continuously-variable shifting state, for example, temporarily placed in the continuously-variable shifting state, for enabling the engine-torque-variation restriction control means 80 to control the engine torque to be transmitted to the second electric motor M2, that is to control the electric path torque, upon determination by the air-fuel ratio control means 90 that the rich spike should be implemented, or upon determination by the oscillation-restriction-region determining means 80 that the vehicle running condition is in the oscillation restriction region.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

While the preferred embodiments of this invention have been described in detail by reference to the accompanying drawings, it is to be understood that the present invention may be otherwise embodied.

In the illustrated embodiments, the non-continuously-variable-shifting-state determining means 84 (step S1 of FIG. 11) is arranged to make the determination as to whether the differential portion 11 is placed in the non-continuously-variable shifting state or not, by determining whether the switching clutch C0 or switching brake B0 is placed in the engaged state by the hydraulic control unit 42. However, the determination may be made by determining whether the vehicle running condition as represented by the vehicle speed V and the output torque $T_{OUT}$ is in the step-variable shifting region defined by the switching boundary line map shown in FIG. 7 by way of example, or by determining whether the vehicle is running in the step-variable shifting state selected by the switch 44.

In the illustrated embodiments, the air-fuel ratio control means 90 is configured to control the fuel supply quantity for a given value of the throttle valve opening angle $\theta_{TH}$ such that the fuel supply quantity is smaller than that of the stoichiometric air-fuel ratio so that the engine is operated in the lean-burn state, and such that the fuel supply quantity is larger than that of the stoichiometric air-fuel ratio so that the engine is operated in the rich-burn state. However, the air-fuel ratio control means 90 may be configured to control the throttle valve opening angle $\theta_{TH}$ for a given value of the fuel supply quantity such that the throttle valve opening angle $\theta_{TH}$ is larger than that of the stoichiometric air-fuel ratio so that the engine is operated in the lean-burn state, and such that the throttle valve opening angle $\theta_{TH}$ is smaller than that of the stoichiometric air-fuel ratio so that the engine is operated in the rich-burn state. Various other modifications of the air-fuel ratio control means 90 may be made.

In the illustrated embodiments, the engine 8 is of a cylinder-injection type arranged to inject the fuel into the cylinders. However, the engine 8 may be of a type provided with a fuel injecting device arranged to inject the fuel into the intake pipe 95.

In the illustrated embodiments, the transmission mechanism 10, 70 is switchable between its continuously-variable shifting state and the step-variable shifting states by placing the differential portion 11 (power distributing mechanism 16) selectively in one of its differential state in which the differential portion is operable as the electrically controlled continuously variable transmission, and the non-differential state (locked state) in which the differential portion 11 is not operable as the step-variable transmission. However, the differential portion 11 placed in its differential state can be operable as the step-variable transmission the speed ratio of which is variable in steps rather than continuously. In other words, the differential and non-differential states of the differential portion 11 do not respectively correspond to the continuously-variable and step-variable shifting states of the transmission mechanism 10, 70, and therefore the differential portion 11 need not be switchable between the continuously-variable and step-variable shifting states. The principle of this invention is applicable to any transmission mechanism 10, 70 (differential portion 11 and power distributing mechanism 16) which is switchable between the differential and non-differential states.

In the illustrated embodiments, the first clutch C1 and the second clutch C2 constituting a part of the automatic transmission portion 20, 72, are provided as coupling devices operable to place the power transmitting path selectively in one of the power transmitting state and the power cut-off state, and these first and second clutches C1, C2 are disposed between the automatic transmission portion 20, 72 and the differential portion 11. However, the first and second clutches C1, C2 may be replaced by at least one coupling device operable to place the power transmitting path selectively in one of the power transmitting state and the power cut-off state. For instance, each of the above-indicated at least one coupling device may be connected to the output shaft 22, or to a suitable rotary member of the automatic transmission portion 20, 72. Further, the coupling device need not constitute a part of the automatic transmission portion 20, 72, and may be provided independently of the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiments, the second electric motor M2 may be connected to a rotary member of the automatic transmission portion 20, 70.

In the illustrated embodiments, the step-variable transmission portion 20, 72 is disposed in the power transmitting path between the drive wheels 38, and the power transmitting member 18 which is the output member of the continuously-variable transmission portion 11 or power distributing mechanism 16. However, the step-variable transmission portion 20, 72 may be replaced by any other type of power transmitting device such: an automatic transmission in the form of a continuously variable transmission (CVT); an automatic transmission which is a permanent-mesh parallel-two-axes type transmission well known as a manual transmission and which is automatically shifted by select cylinders and shift cylinders; and a manual transmission of synchronous meshing type which is manually shifted. Where the step-variable transmission portion is replaced by the continuously variable transmission (CVT), the transmission mechanism as a whole is placed in the step-variable shifting state when the power distributing mechanism 16 is placed in its fixed-speed-ratio shifting state. In the step-variable shifting state, the drive force is transmitted primarily through a mechanical power transmitting path, and not through an electric path. The above-indicated continuously variable transmission may be controlled to change its speed ratio to a selected one of a plurality of fixed values which correspond to respective gear position of a step-variable transmission and which are stored in a memory, so that the speed ratio of the transmission mechanism can be changed in steps. Further, the principle of this invention is applicable to a transmission mechanism not provided with the automatic transmission portion 20, 72. Where the automatic transmission portion 20, 72 is replaced by the continuously variable transmission (CVT) or the permanent-mesh type, or where the automatic transmission 20, 72 is not provided, a coupling device may be disposed in a power transmitting path between the power transmitting member 18 and the drive wheels 38, so that the power transmitting path is switchable between the power transmitting state and the power cut-off state, by engaging and releasing actions of the coupling device.

While the automatic transmission portion 20, 72 in the preceding embodiments is connected in series to the differential portion 11 through the power transmitting member 18, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine 8, and a pair of bevel gears which mesh with the pinion and which are respectively operatively connected to the first electric motor M1 and the power transmitting member 18.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

The invention claimed is:

1. A control apparatus for a vehicular drive system including an engine, and a continuously-variable transmission portion operable as an electrically controlled continuously variable transmission and having a differential mechanism operable to distribute an output of the engine to a first electric motor and a power transmitting member, and a second electric motor disposed in a power transmitting path between said power transmitting member and a drive wheel of a vehicle, said control apparatus comprising:

a differential-state switching device disposed in said differential mechanism and configured to place said continuously-variable transmission portion selectively in one of a continuously-variable shifting state in which the continuously-variable transmission portion is operable as said electrically controlled continuously variable transmission, and a non-continuously-variable shifting state in which the continuously-variable transmission portion is not operable as said electrically controlled continuously variable transmission;

engine-torque-variation restriction control means configured to control an electric energy to be supplied to said second electric motor in said continuously-variable shifting state of said continuously-variable transmission portion, for restricting a variation of a transmission torque to be transmitted to said power transmitting member, which variation is caused by a variation of an output torque of said engine; and switching control means operable when said continuously-variable transmission portion is placed in said non-continuously-variable shifting state, and configured to switch said continuously-variable transmission portion to said continuously-variable shifting state, for enabling said engine-torque-variation restriction control means to control the electric energy to be supplied to said second electric motor.

2. The control apparatus according to claim 1, wherein said engine has a variable air-fuel ratio, said control apparatus further comprising air-fuel ratio control means configured to implement a rich spike for temporarily hold said engine in a rich-burn state, and wherein said engine-torque-variation restriction control means limits the electric energy to be supplied to said second electric motor, while an output torque of said engine is varying due to the rich spike implemented by said air-fuel ratio control means.

3. The control apparatus according to claim 1, further comprising an electric energy storage device for storing the electric energy, and wherein said engine-torque-variation restriction control means limits the electric energy to be supplied to said second electric motor by storing the electric energy in said electric energy storage device.

4. The control apparatus according to claim 3, wherein said engine-torque-variation restriction control means varies a rotating speed of said first electric motor in synchronization with oscillation of an output torque of said engine, to thereby restrict the oscillation of said output torque to be transmitted to said power transmitting member.

5. The control apparatus according to claim 1, wherein said differential-state switching device places said differential mechanism in a differential state in which the differential mechanism is operable to perform a differential function, to thereby place said continuously-variable transmission portion in said continuously-variable shifting state, and places said differential mechanism in a non-differential state in which the differential mechanism is not operable to perform the differential function, to thereby place said continuously-variable transmission portion in said non-continuously-variable shifting state.

6. The control apparatus according to claim 5, wherein said differential mechanism has a first element connected to said engine, a second element connected to said first electric motor, and a third element connected to said power transmitting member, and said differential-state switching device causes said first through third elements to be rotatable relative to each other, for thereby placing said differential portion in said differential state, and causes said first through third elements to be rotated as a unit or to hold said second element stationary, for thereby placing said differential portion in said non-differential state.

7. The control apparatus according to claim 6, wherein said differential-state switching device includes a clutch operable to connect any two elements of said first through third elements to each other for rotating said first through third elements as a unit, and/or a brake operable to fix said second element to a stationary member.

8. The control apparatus according to claim 7, wherein said clutch and said brake are released to place said differential mechanism in said differential state in which said first through third elements are rotatable relative to each other, to enable the differential mechanism to operate as an electrically controlled differential device, and said clutch is engaged to enable said differential mechanism to operate as a transmission having a speed ratio of 1, or said brake is engaged to enable said differential mechanism to operate as a speed-increasing transmission having a speed ratio smaller than 1.

9. The control apparatus according to claim 6, wherein said differential mechanism includes a planetary gear set having a carrier functioning as said first element, a sun gear functioning as said second element, and a ring gear functioning as said third element.

10. The control apparatus according to claim 9, wherein said planetary gear set includes a single-pinion type planetary gear set.

11. The control apparatus according to claim 1, wherein said power transmitting path includes another transmission portion, and the vehicular drive system has an overall speed ratio defined by a speed ratio of said another transmission portion and a speed ratio of said continuously-variable transmission portion.

12. The control apparatus according to claim 11, wherein said another transmission portion includes a step-variable automatic transmission.

13. A control apparatus for a vehicular drive system including an engine, and a differential portion having a differential mechanism operable to distribute an output of the engine to a first electric motor and a power transmitting member, and a second electric motor disposed in a power transmitting path between said power transmitting member and a drive wheel of a vehicle, said control apparatus comprising:

a differential-state switching device disposed in said differential mechanism and configured to place said differential portion selectively in one of a differential state in which the differential mechanism is operable to perform a differential function, and a non-differential state in which the differential mechanism is not operable to perform the differential function;

engine-torque-variation restriction control means configured to control an electric energy to be supplied to said second electric motor in said differential state of said differential portion, for restricting a variation of a transmission torque to be transmitted to said power transmitting member, which variation is caused by a variation of an output torque of said engine; and switching control means operable when said differential portion is placed in said non-differential state, and configured to switch said differential portion to said differential state, for enabling said engine-torque-variation restriction control means to control the electric energy to be supplied to said second electric motor.

14. The control apparatus according to claim 13, wherein said power transmitting path includes another transmission portion, and the vehicular drive system has an overall speed ratio defined by a speed ratio of said another transmission portion and a speed ratio of said differential portion.

15. The control apparatus according to claim 14, wherein said another transmission portion includes a step-variable automatic transmission.

* * * * *